(12) United States Patent
Nishimoto

(10) Patent No.: US 12,423,750 B2
(45) Date of Patent: Sep. 23, 2025

(54) SETTLEMENT PROCESSING SYSTEM, SETTLEMENT PROCESSING METHOD, SETTLEMENT PROCESSING PROGRAM, AND COMPUTER READABLE RECORDING MEDIUM ON WHICH SETTLEMENT PROCESSING PROGRAM IS RECORDED, WHICH MAKE USE OF DIGITAL ASSETS

(71) Applicant: INTERTRADE Co., Ltd., Tokyo (JP)

(72) Inventor: Kazuya Nishimoto, Tokyo (JP)

(73) Assignee: INTERTRADE CO., LTD., Tokyo (JP)

(*) Notice: Subject to any disclaimer, the term of this patent is extended or adjusted under 35 U.S.C. 154(b) by 0 days.

(21) Appl. No.: 17/757,473

(22) PCT Filed: Mar. 30, 2021

(86) PCT No.: PCT/JP2021/013669
§ 371 (c)(1),
(2) Date: Jun. 16, 2022

(87) PCT Pub. No.: WO2022/208688
PCT Pub. Date: Oct. 6, 2022

(65) Prior Publication Data
US 2024/0169431 A1    May 23, 2024

(51) Int. Cl.
*G06Q 40/04*  (2012.01)

(52) U.S. Cl.
CPC .................... *G06Q 40/04* (2013.01)

(58) Field of Classification Search
None
See application file for complete search history.

(56) References Cited

U.S. PATENT DOCUMENTS

2005/0246263 A1   11/2005   Ogg et al.
2022/0391978 A1*  12/2022   Givot ............... G06Q 40/04

FOREIGN PATENT DOCUMENTS

JP   2002-149981 A   5/2002
JP   2008-059292 A   3/2008
(Continued)

OTHER PUBLICATIONS

International Search Report and Written Opinion of PCT Application No. PCT/JP2021/013669, issued on Jun. 22, 2021, 8 pages of ISRWO.
(Continued)

*Primary Examiner* — Matthew S Gart
*Assistant Examiner* — Amit Patel
(74) *Attorney, Agent, or Firm* — CHIP LAW GROUP

(57) ABSTRACT

To provide a settlement processing system making use of digital assets that can assure, without using arbitrage function by HET, price linkage between a first order book and a second order book and trading liquidity between the order books.
[Solution]
The settlement processing system is configured to convert the data format of the second order book on which listed is order information on ordered quantity for commodity tokens at certain amounts of commodity tokens per minimum unit amount of a currency, which are less than a minimum unit quantity of a commodity, into the data format of the first order book on which listed is order information on ordered quantity for the commodity at certain prices per minimum unit quantity of the commodity, merge the first order book and the converted second order book to generate a composite order book, calculate the total value of ordered quantity for each of sell and buy on the composite order book, separate the total value of ordered quantity into a first total
(Continued)

value that is an integer multiple of a minimum trading unit on the first order book and a second total value as a remaining value, and compare sell orders against buy orders on the composite order book, to make matched sell orders and buy orders executed in order from the first total value to the second total value.

4 Claims, 24 Drawing Sheets

(56)  References Cited

FOREIGN PATENT DOCUMENTS

JP            6861782 B1     4/2021
WO    2008-087834 A1     7/2008

OTHER PUBLICATIONS

Extended European Search Report in EP Application No. 21934858.8 dated Aug. 14, 2024.

* cited by examiner

FIG.14

FIRST TRANSACTION
EXECUTING MEANS (1ST TE)

START

MAKE, AMONG ORDR INFO STORD IN 1ST OIS 2, SELL ORDRS OR BUY ORDRS DERIVD FROM 1ST ORDR BOOK AND IDENTFD BY 1ST MOI 11 AS MATCHD ORDRS ON COMPST ORDR BOOK EXCUTD IN ORDR OF ORDR PRICE AND IN ORDR OF EARLIER TO LATER ORDR TIME — S13-1

UPDATE 1ST OIS 2 SO THAT ORDR INFO CRRSPONDNG TO EXCUTD SELL ORDRS OR BUY ORDRS SHOWS "ALRDY EXCUTD" STATUS — S13-2

MAKE, AMONG ORDR INFO STORD IN 2ND OIS 4, SELL ORDRS OR BUY ORDRS DERIVD FROM CNVERTD 2ND ORDR BOOK AND IDENTFD BY 1ST MOI 11 AS MATCHD ORDRS ON COMPST ORDR BOOK AND RECNVERTD BY 1ST DFRC 12 TO HAVE SAME DATA FORMT AS 2ND ORDR BOOK EXCUTD IN ORDR OF AMNT OF CMMDTY TOKNS/UNIT AMNT OF CRRNCY AND IN ORDR OF EARLIER TO LATER ORDR TIME — S13-3

UPDATE 2ND OIS 4 SO THAT ORDR INFO CRRSPONDNG TO EXCUTD SELL ORDRS OR BUY ORDRS SHOWS "ALRDY EXCUTD" STATUS — S13-4

END n IS INTEGER 2 OR GREATER

FIG.23
SETTLEMENT PROCESSING SYSTEM DISCUSSED AT
PRELIMINARY STAGE OF THE PRESENT PROPOSAL
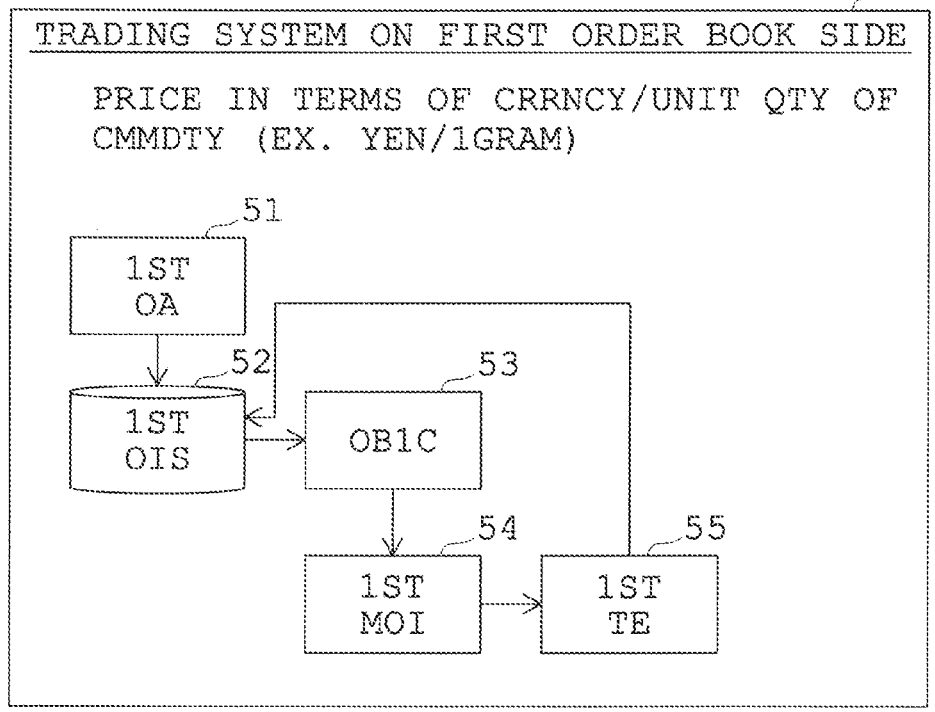
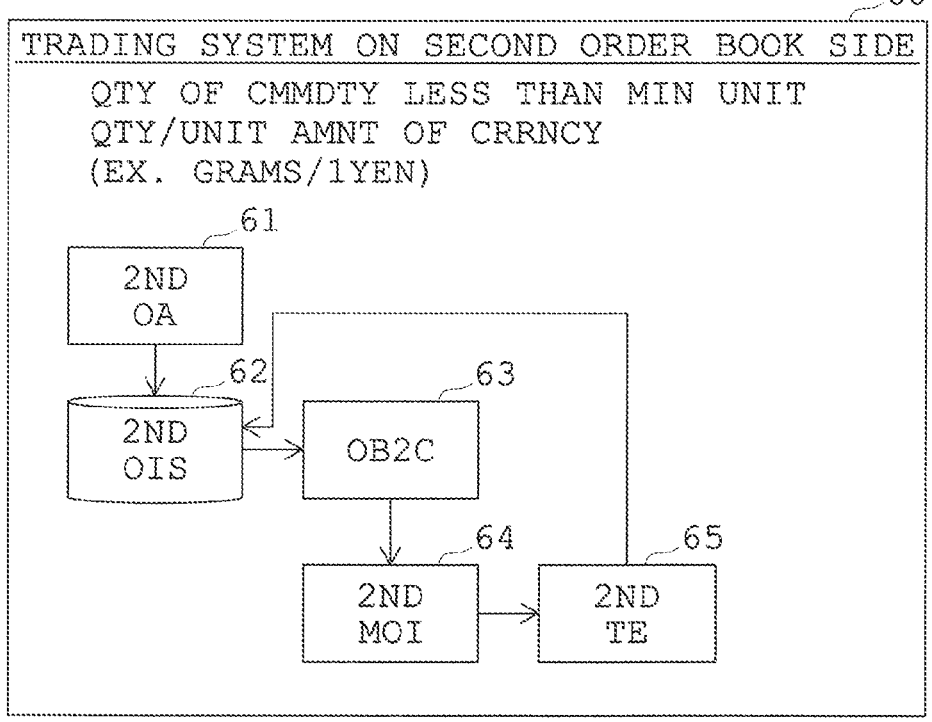

SETTLEMENT PROCESSING SYSTEM, SETTLEMENT PROCESSING METHOD, SETTLEMENT PROCESSING PROGRAM, AND COMPUTER READABLE RECORDING MEDIUM ON WHICH SETTLEMENT PROCESSING PROGRAM IS RECORDED, WHICH MAKE USE OF DIGITAL ASSETS

CROSS REFERENCE TO RELATED APPLICATIONS

This application is a U.S. National Phase of International Patent Application No. PCT/JP2021/013669 filed Mar. 30, 2021. The contents of which is hereby incorporated herein by reference in its entirety.

TECHNICAL FIELD

The present invention relates to a settlement processing system, a settlement processing method, a settlement processing program, and a computer-readable recording medium on which the settlement processing program is recorded, which are to conduct settlement of commodity trading upon making use of digital assets, whose economic value is digitally expressible.

In this specification of the application, "system" is intended to mean a computer system that is configured of a combination of elements including a computer and other electronic apparatuses, software, communication networks, and data, to feasibly actualize information processing by the software using the hardware resources.

BACKGROUND ART

An asset is something that has economic value, which is assessed in terms of currency (issued by each country or region (Yen in Japan, US dollar in USA, Euro in Europe or the like), and that can be sold and purchased for the assessed economic value.

At major commodity exchanges in the world, trading is conducted on the basis of the unit (depending on the exchanges) of the commodity to be traded, with the economic value of the commodity being presented in the currency issued by each country.

In recent years, digitalization technology has come to facilitate trading of digital assets, whose economic value is digitally expressed.

In particular, assets having stylized economic value, for example commodities (merchandise traded at commodity exchanges), are strongly characterized by being tradable as digital assets.

SUMMARY OF THE INVENTION

Problems to be Solved by the Invention

Regarding trading for which the economic value of merchandise is presented in term of the currency issued by each country or region per minimum unit quantity (which varies with exchanges) of the merchandise, which is an object of the trading, as done at commodity exchanges, the order price is liable to be high and the number of traders tends to be limited.

In many cases of commodities traded at commodity exchanges, what is exchanged with the currency after execution of a transaction is not necessarily the physical commodity but a digitized token equivalent to a deposit certificate of the commodity.

In consideration of the fact that digitized tokens equivalent to deposit certificates are used for transactions at commodity exchanges, it seems possible to conduct ultra-small transactions upon regarding less than minimum unit quantity of the commodity also as digitized commodity tokens.

Therefore, as a method for trading a commodity for low prices by a large number of traders, the present inventor researched and discussed the idea of conducting ultra-small transactions of the commodity as digital assets upon presenting the economic value of less than minimum unit quantity of the commodity in terms of amount of commodity tokens per unit amount of the currency.

However, no conventional commodity exchange is provided with such a system for conducting ultra-small transactions of commodities as digital assets upon presenting the economic value of less than minimum unit quantity of the commodities in terms of amount of commodity tokens per unit amount of the currency.

In this situation, the present inventor conceived, examined and discussed a settlement system making use of digital assets that would have, independent of each other: a trading system provided with a first order book for conducting transactions upon presenting economic value of a commodity as evaluated prices in terms of currency per unit of the commodity in the same manner as at the conventional commodity exchanges; and a trading system provided with a second order book for conducting ultra-small transactions of the commodity as digital assets upon presenting economic value of less than minimum unit quantity of the commodity in terms of amount of commodity tokens per unit amount of the currency.

As a result of examination and discussion, it was found that, in a case where there be built a settlement system making use of digital assets having, independent of each other, both of a trading system provided with the first order book and a trading system provided with the second order book, the arbitrage function through HFT would likely to be involved for assuring reasonableness of prices on the both order books and trading liquidity between the order books, and that, since HFT is a technique of trading in which automatic transactions are repeated at high speed and at high frequency in accordance with a program carrying built-in procedures, if the arbitrage function by HFT should be involved in both of the trading systems above, repetition of frequent placement of orders derived from failure of arbitrage would make the load on the system domain enormous, hindering smooth trading.

The present invention has been made in view of the above-described problem, and its object is to provide a settlement processing system, a settlement processing method, a settlement processing program, and a computer-readable recording medium on which the settlement processing program is recorded, each of which, making use of digital assets, makes it possible to conduct transactions, in the same manner as conventionally done at the major commodity exchanges in the world, with use of a first order book on which economic value of a commodity is presented as prices evaluated in terms of currency per unit amount of the commodity, and to conduct ultra-small transactions of the commodity as digital assets, which have not been conducted at the major commodity exchanges in the world, with use of a second order book on which economic value of less than minimum unit quantity of the commodity is presented in terms of amount of commodity tokens per unit amount of the currency, and makes it possible to conduct smooth transactions upon assuring price linkage between the first order book and the second order book and trading liquidity between the order books while preventing the load on the system domain from growing enormously because of involvement of arbitrage function by HFT.

Measures to Solve the Problems

In order to attain the above object, a settlement processing system making use of digital assets according to the present invention includes: a first order-accepting means, which displays on a screen quote prices of same commodity as that traded at major commodity exchanges per minimum unit quantity of the commodity and accepts trading orders for the commodity at certain prices per minimum unit quantity of the commodity; a first order-information storage, which stores order information on the trading orders for the commodity accepted by the first order-accepting means upon sorting the orders by price and order time for each of sell and buy; a second order-accepting means, which displays on a screen quote amounts of commodity tokens per unit amount of a currency, which are less than a minimum unit quantity of the commodity, and accepts trading orders for commodity tokens at certain amounts of commodity tokens per unit amount of the currency; a second order-information storage, which stores order information on the trading orders for commodity tokens accepted by the second order-accepting means upon sorting the orders by amount of commodity tokens and order time for each of sell and buy; an order book I creating means, which reads out the order information on the trading orders for the commodity stored in the first order-information storage, counts ordered quantity at each price, and creates a first order book on which the ordered quantities as counted are listed in order of price; an order book II creating means, which reads out the order information on the trading orders for the commodity tokens stored in the second order-information storage, counts ordered quantity at each amount of commodity tokens, and creates a second order book on which the ordered quantities as counted are listed in order of amount of commodity tokens; a data format converting means, which creates a converted second order book by converting a data format of the second order book created by the order book II creating means into a same format as that of the first order book; a composite order book creating means, which creates a composite order book by merging the first order book created by the order book I creating means and the converted second order book created by the data format converting means in such a manner that order information is sorted by price; an ordered-quantity total value calculating means, which calculates a total value of ordered quantity up to or down to each price for each of sell and buy on the composite order book; an ordered-quantity total value separating means, which separates the total value of ordered quantity at each price for each of sell and buy, which is calculated by the ordered-quantity total value calculating means, into a first total value that is a largest integer multiple of a minimum trading unit on the first order book equal to or smaller than the total value of ordered quantity itself and a second total value as a remaining value after subtraction of the first total value; a first matched-order identifying means, which compares sell orders against buy orders on the composite order book, to specify a price range in which prices for sell orders and prices for buy orders match and to identify, in the price range as specified, an equal ordered quantity, which is smaller one of the respective first total values of sell orders and buy orders, of sell orders and buy orders as matched orders; a first data format reconverting means, which reconverts, out of the orders identified by the first matched-order identifying means as matched orders on the composite order book, sell orders or buy orders that are derived from the converted second order book to have a same data format as that of the second order book; a first transaction executing means, which makes, out of the order information stored in the first order-information storage, sell orders or buy orders that are derived from the first order book and identified by the first matched-order identifying means as matched orders on the composite order book executed in order of order price and in order of earlier to later order time, updates the first order-information storage so that order information corresponding to the executed sell orders or buy orders shows "already executed" status, makes, out of the order information stored in the second order-information storage, sell orders or buy orders that are derived from the converted second order book and identified by the first matched-order identifying means as matched orders on the composite order book and then reconverted by the first data format reconverting means to have the same data format as that of the second order book executed in order of amount of commodity tokens per unit amount of the currency and in order of earlier to later order time, and updates the second order-information storage so that order information corresponding to the executed sell orders or buy orders shows "already executed" status; a composite order book updating means, which updates the composite order book by subtracting the equal ordered quantity of sell orders and buy orders identified as matched orders by the first matched-order identifying means and made executed via the first transaction executing means from the ordered quantity where the price is matched and the total value of ordered quantity respectively for each of sell and buy on the composite order book; a second matched-order identifying means, which compares sell orders against buy orders on the composite order book updated by the composite order-book updating means, to specify a price range in which prices for sell orders and prices for buy orders match and to identify, in the price range as specified, an equal ordered quantity, which is smaller one of the respective second total values of sell orders and buy orders, of sell orders and buy orders as matched orders; a second data format reconverting means, which reconverts, out of the orders identified by the second matched-order identifying means as matched orders on the composite order book, sell orders or buy orders that are derived from the converted second order book to have the same data format as that of the second order book; and a second transaction executing means, which makes, out of the order information stored in the second order-information storage, sell orders or buy orders that are derived from the converted second order book, identified by the second matched-order identifying means as matched orders on the composite order book and then reconverted to have the same data format as that of the second order book by the second data format reconverting means executed in order of amount of commodity tokens per unit amount of the currency and in order of earlier to later order time, and updates the second order-information storage so that order information corresponding to the executed sell orders or buy orders shows "already executed" status.

For the settlement processing system making use of digital assets according to the present invention, commodities to be traded preferably are those having digitally expressible economic value such as precious metals, energy resources, storable crops, artworks, and drinking water.

Also, a settlement processing method according to the present invention is a method in a settlement processing system that makes use of digital assets and is configured to have a computer and software provided for the computer. The settlement processing method includes: a first order-accepting step of displaying on a screen quote prices of same commodity as that traded at major commodity exchanges per minimum unit quantity of the commodity and accepting trading orders for the commodity at certain prices per minimum unit quantity of the commodity; a first order-information storing step of storing in a first order-information storage order information on the trading orders for the commodity accepted at the first order-accepting step upon sorting the orders by price and order time for each of sell and buy; a second order-accepting step of displaying on a screen quote amounts of commodity tokens per unit amount of a currency, which are less than a minimum unit quantity of the commodity, and accepting trading orders for commodity tokens at certain amounts of commodity tokens per unit amount of the currency; a second order-information storing step of storing in a second order-information storage order information on the trading orders for commodity tokens accepted at the second order-accepting step upon sorting the orders by amount of commodity tokens and order time for each of sell and buy; an order book I creating step of reading out the order information on the trading orders for the commodity stored in the first order-information storage, counting ordered quantity at each price, and creating a first order book on which the ordered quantities as counted are listed in order of price; an order book II creating step of reading out the order information on the trading orders for the commodity tokens stored in the second order-information storage, counting ordered quantity at each amount of commodity tokens, and creating a second order book on which the ordered quantities as counted are listed in order of amount of commodity tokens; a data format converting step of creating a converted second order book by converting a data format of the second order book created at the order book II creating step into a same format as that of the first order book; a composite order book creating step of creating a composite order book by merging the first order book created at the order book I creating step and the converted second order book created at the data format converting step in such a manner that order information is sorted by price; an ordered-quantity total value calculating step of calculating a total value of ordered quantity up to or down to each price for each of sell and buy on the composite order book; an ordered-quantity total value separating step of separating the total value of ordered quantity at each price for each of sell and buy, which is calculated at the ordered-quantity total value calculating step, into a first total value that is a largest integer multiple of a minimum trading unit on the first order book equal to or smaller than the total value of ordered quantity itself and a second total value as a remaining value after subtraction of the first total value; a first matched-order identifying step of comparing sell orders against buy orders on the composite order book, to specify a price range in which prices for sell orders and prices for buy orders match and to identify, in the price range as specified, an equal ordered quantity, which is smaller one of the respective first total values of sell orders and buy orders, of sell orders and buy orders as matched orders; a first data format reconverting step of reconverting, out of the orders identified at the first matched-order identifying step as matched orders on the composite order book, sell orders or buy orders that are derived from the converted second order book to have a same data format as that of the second order book; a first transaction executing step of making, out of the order information stored in the first order-information storage, sell orders or buy orders that are derived from the first order book and identified at the first matched-order identifying step as matched orders on the composite order book executed in order of order price and in order of earlier to later order time, updating the first order-information storage so that order information corresponding to the executed sell orders or buy orders shows "already executed" status, making, out of the order information stored in the second order-information storage, sell orders or buy orders that are derived from the converted second order book and identified at the first matched-order identifying step as matched orders on the composite order book and then reconverted at the first data format reconverting step to have the same data format as that of the second order book executed in order of amount of commodity tokens per unit amount of the currency and in order of earlier to later order time, and updating the second order-information storage so that order information corresponding to the executed sell orders or buy orders shows "already executed" status; a composite order book updating step of updating the composite order book by subtracting the equal ordered quantity of sell orders and buy orders identified as matched orders at the first matched-order identifying step and made executed at the first transaction executing step from the ordered quantity where the price is matched and the total value of ordered quantity respectively for each of sell and buy on the composite order book; a second matched-order identifying step of comparing sell orders against buy orders on the composite order book updated at the composite order-book updating step, to specify a price range in which prices for sell orders and prices for buy orders match and to identify, in the price range as specified, an equal ordered quantity, which is smaller one of the respective second total values of sell orders and buy orders, of sell orders and buy orders as matched orders; a second data format reconverting step of reconverting, out of the orders identified at the second matched-order identifying step as matched orders on the composite order book, sell orders or buy orders that are derived from the converted second order book to have the same data format as that of the second order book; and a second transaction executing step of making, out of the order information stored in the second order-information storage, sell orders or buy orders that are derived from the converted second order book, identified at the second matched-order identifying step as matched orders on the composite order book and then reconverted to have the same data format as that of the second order book at the second data format reconverting step executed in order of amount of commodity tokens per unit amount of the currency and in order of earlier to later order time, and updating the second order-information storage so that order information corresponding to the executed sell orders or buy orders shows "already executed" status.

Also, a settlement processing program according to the present invention is a program in a settlement processing system that makes use of digital assets and is configured to have a computer and software provided for the computer. The settlement processing program makes the computer execute: a first order-accepting step of displaying on a screen quote prices of same commodity as that traded at major commodity exchanges per minimum unit quantity of the commodity and accepting trading orders for the commodity at certain prices per minimum unit quantity of the commodity; a first order-information storing step of storing in a first order-information storage order information on the trading orders for the commodity accepted at the first order-accepting step upon sorting the orders by price and order time for each of sell and buy; a second order-accepting step of displaying on a screen quote amounts of commodity tokens per unit amount of a currency, which are less than a minimum unit quantity of the commodity, and accepting trading orders for commodity tokens at certain amounts of commodity tokens per unit amount of the currency; a second order-information storing step of storing in a second order-information storage order information on the trading orders for commodity tokens accepted at the second order-accepting step upon sorting the orders by amount of commodity tokens and order time for each of sell and buy; an order book I creating step of reading out the order information on the trading orders for the commodity stored in the first order-information storage, counting ordered quantity at each price, and creating a first order book on which the ordered quantities as counted are listed in order of price; an order book II creating step of reading out the order information on the trading orders for the commodity tokens stored in the second order-information storage, counting ordered quantity at each amount of commodity tokens, and creating a second order book on which the ordered quantities as counted are listed in order of amount of commodity tokens; a data format converting step of creating a converted second order book by converting a data format of the second order book created at the order book II creating step into a same format as that of the first order book; a composite order book creating step of creating a composite order book by merging the first order book created at the order book I creating step and the converted second order book created at the data format converting step in such a manner that order information is sorted by price; an ordered-quantity total value calculating step of calculating a total value of ordered quantity up to or down to each price for each of sell and buy on the composite order book; an ordered-quantity total value separating step of separating the total values of ordered quantity at each price for each of sell and buy, which is calculated at the ordered-quantity total value calculating step, into a first total value that is a largest integer multiple of a minimum trading unit on the first order book equal to or smaller than the total value of ordered quantity itself and a second total value as a remaining value after subtraction of the first total value; a first matched-order identifying step of comparing sell orders against buy orders on the composite order book, to specify a price range in which prices for sell orders and prices for buy orders match and to identify, in the price range as specified, an equal ordered quantity, which is smaller one of the respective first total values of sell orders and buy orders, of sell orders and buy orders as matched orders; a first data format reconverting step of reconverting, out of the orders identified at the first matched-order identifying step as matched orders on the composite order book, sell orders or buy orders that are derived from the converted second order book to have a same data format as that of the second order book; a first transaction executing step of making, out of the order information stored in the first order-information storage, sell orders or buy orders that are derived from the first order book and identified at the first matched-order identifying step as matched orders on the composite order book executed in order of order price and in order of earlier to later order time, updating the first order-information storage so that order information corresponding to the executed sell orders or buy orders shows "already executed" status, making, out of the order information stored in the second order-information storage, sell orders or buy orders that are derived from the converted second order book and identified at the first matched-order identifying step as matched orders on the composite order book and then reconverted at the first data format reconverting step to have the same data format as that of the second order book executed in order of amount of commodity tokens per unit amount of the currency and in order of earlier to later order time, and updating the second order-information storage so that order information corresponding to the executed sell orders or buy orders shows "already executed" status; a composite order book updating step of updating the composite order book by subtracting the equal ordered quantity of sell orders and buy orders identified as matched orders at the first matched-order identifying step and made executed at the first transaction executing step from the ordered quantity where the price is matched and the total value of ordered quantity respectively for each of sell and buy on the composite order book; a second matched-order identifying step of comparing sell orders against buy orders on the composite order book updated at the composite order-book updating step, to specify a price range in which prices for sell orders and prices for buy orders match and to identify, in the price range as specified, an equal ordered quantity, which is smaller one of the respective second total values of sell orders and buy orders, of sell orders and buy orders as matched orders; a second data format reconverting step of reconverting, out of the orders identified at the second matched-order identifying step as matched orders on the composite order book, sell orders or buy orders that are derived from the converted second order book to have the same data format as that of the second order book; and a second transaction executing step of making, out of the order information stored in the second order-information storage, sell orders or buy orders that are derived from the converted second order book, identified at the second matched-order identifying step as matched orders on the composite order book and then reconverted to have the same data format as that of the second order book at the second data format reconverting step executed in order of amount of commodity tokens per unit amount of the currency and in order of earlier to later order time, and updating the second order-information storage so that order information corresponding to the executed sell orders or buy orders shows "already executed" status.

Also, a computer-readable recording medium according to the present invention is characterized in that the above-mentioned settlement processing program of the present invention is recorded on it.

Effect of the Invention

According to the present invention, it is possible to obtain a settlement processing system, a settlement processing method, a settlement processing program, and a computer-readable recording medium on which the settlement processing program is recorded, each of which, making use of digital assets, makes it possible to conduct transactions, in the same manner as conventionally done at the major commodity exchanges in the world, with use of a first order book on which economic value, as evaluated prices, of a commodity is presented in terms of currency per unit of the commodity, and to conduct ultra-small transactions of the commodity as digital assets, which have not been conducted at the major commodity exchanges in the world, with use of a second order book on which economic value of less than minimum unit quantity of the commodity is presented in terms of amount of commodity tokens per unit of currency, and makes it possible to conduct smooth transactions upon assuring price linkage between the first order book and the second order book and trading liquidity between the order books while preventing the load on the system domain from growing enormously because of involvement of arbitrage function by HFT.

BRIEF DESCRIPTION OF THE DRAWINGS

FIG. 14 is a flowchart that shows one example of processing outline by the first transaction executing means in the settlement processing system making use of digital assets of FIG. 1.

FIG. 23 is an explanatory diagram that schematically shows the overall configuration of one example of the settlement processing system that the present inventor discussed and examined first at the stage before deriving the present invention.

MODE FOR CARRYING OUT THE INVENTION

Figure 1:
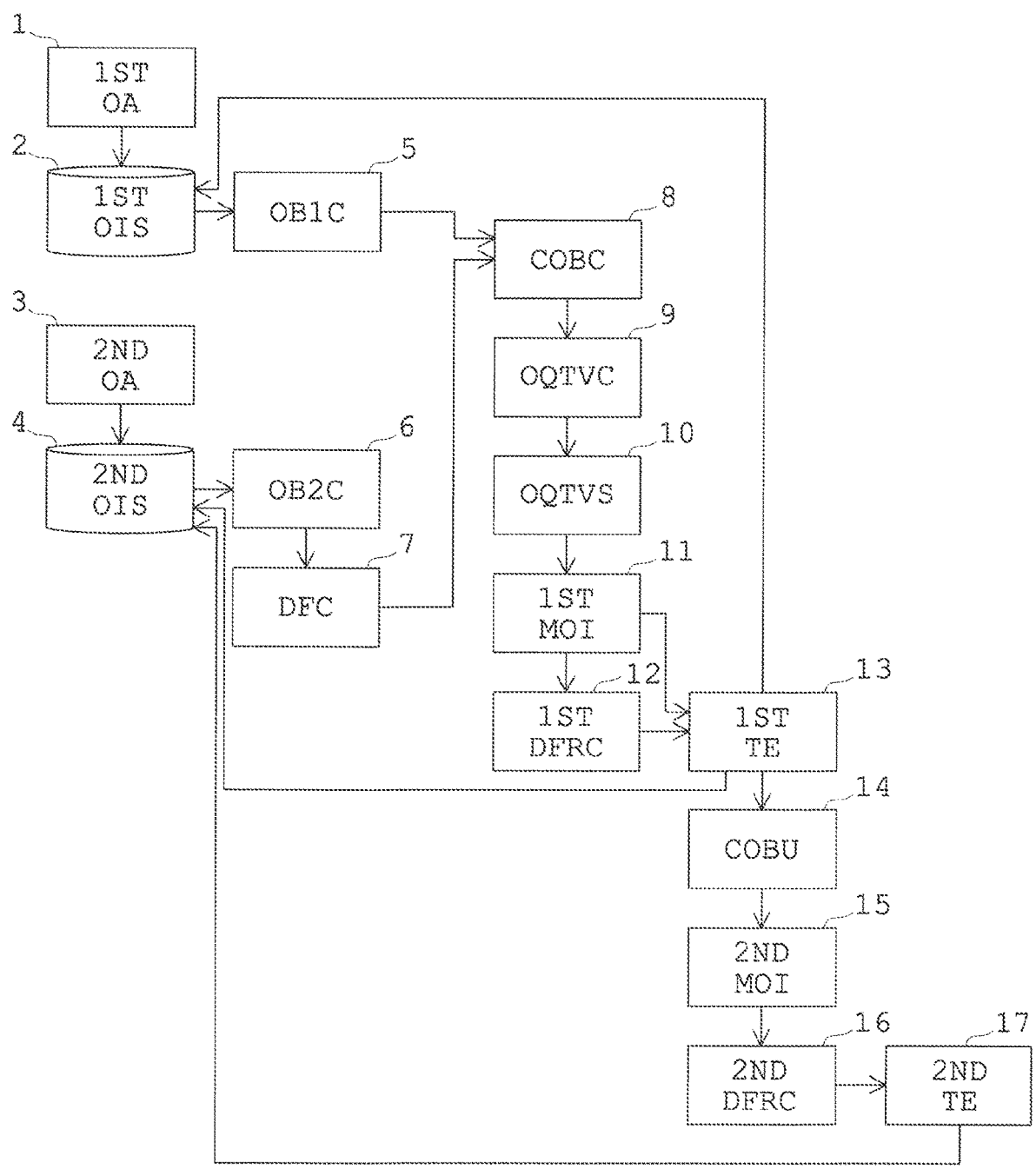
FIG. 1 is an explanatory diagram that schematically shows the overall configuration of the settlement processing system making use of digital assets according to the first embodiment mode of the present invention.

Preceding the explanation of the embodiment modes, how the present invention has been derived and function and effect of the present invention will be explained.

As stated above, in recent years, digitalization technology has come to facilitate trading of digital assets, whose economic value is digitally expressed.

In particular, assets having stylized economic value, for example commodities (merchandise traded at commodity exchanges), are strongly characterized by being tradable as digital assets, whose economic value is digitally expressed.

Regarding trading for which the economic value of merchandise is presented in term of the currency issued by each country or region per minimum unit quantity (which varies with exchanges) of the merchandise, which is an object of the trading as those traded at commodity trade exchanges, the order price is liable to be high and the number of traders tends to be limited.

In many cases of commodities traded at commodity exchanges, what is exchanged with the currency after execution of a transaction is not necessarily the physical commodity but a digitized token equivalent to a deposit certificate of the commodity.

In consideration of the fact that digitized tokens equivalent to deposit certificates are used for transactions at commodity exchanges, it seems possible to conduct ultra-small transactions upon regarding less than minimum unit quantity of the commodity also as digitized commodity tokens.

This consideration will be exemplified with gold as commodity.

At present, the price of gold is published in terms of sell price and buy price per gram at commodity exchanges in Japan.

For example, when one desires to purchase a physical gold bar of 500 g, if the price of gold bar is presented to be 5000 yen per 1 g, the gold bar can be purchased for 2,500,000 yen asset (currency).

Here, consideration will be made on how economic value, as digital expression, of physical gold could be distributed as digital assets.

Digital assets whose economic value is digitally expressed are those issued as digital data indicating economic value of physical assets in accordance with the amount of assets held (for example, token (newly created virtual currency upon an existing blockchain) for which blockchain technology with use of smart contract is used).

For example, if an owner owns 1000 g of physical gold, an issuer who receives from the owner a trust of gold or an owner themself as an issuer issues an amount of token equivalent to the economic value of the amount of physical gold held (1000 g) (for example, if 1 token is defined to be equivalent to 1 g, the amount of issuance is 1000 token).

In this example, when the economic value of physical gold is 5000 yen per 1 g, 1 token of gold can be bought for 5000 yen and 1 token of gold can be sold for 5000 yen.

Also, a consideration will be made on a trading system in which a transaction of gold is settled in yen.

An exchange presents yen price per gram for trading on the basis of grams.

Traders designate yen price for which they wish to trade, and buy (or sell) integer quantity of weight in grams of gold having economic value corresponding to the designated yen price.

Here, in a transaction in which the settlement is made in yen (a transaction such as purchase of merchandise at a shop), if the settlement could be done in a deposit certificate of physical gold, digitized economic value of less than minimum unit quantity of physical gold, or gold (gold token) as a digital asset could be used for settlement.

In the case of conducting a settlement using gold (gold token) as digital asset, a transaction on the basis of yen requires that weight of gold in grams per yen is presented.

In presenting the weight of gold having economic value equivalent to 1 yen, if 1 gram is equivalent to 5000 yen, 1 yen is equivalent to 0.0002 g, or the weight of gold in grams to be presented should be a minute quantity.

While trading is conducted on the basis of the unit (depending on the exchanges) of the commodity to be traded with use of a first order book on which the economic value of the commodity is presented in the currency issued by each country or region at the major commodity exchanges as stated above, there is no system for conducting ultra-small transactions upon economic value of less than minimum unit quantity of the commodity being presented in terms of amount of commodity tokens.

Here, the present inventor conceived, examined and discussed a settlement system making use of digital assets that would have, independent of each other: a trading system provided with a first order book for conducting transactions upon presenting economic value of a commodity as evaluated prices in terms of currency per unit of the commodity in the same manner as at the conventional commodity exchanges; and a trading system provided with a second order book for conducting ultra-small transactions of the commodity as digital assets upon presenting economic value of minimum unit quantity of the commodity in terms of amount of commodity tokens per unit of currency.

It is assumed that the issuer of digital assets and a place where digital assets and physical commodity are exchanged are separately prepared in association with this system.

Settlement Processing System Making Use of Digital Assets that was Discussed and Examined at the Stage Before the Present Invention FIG. 23 is an explanatory diagram that schematically shows the overall configuration of one example of the settlement processing system that the present inventor discussed and examined first at the stage before deriving the present invention.

The settlement processing system making use of digital assets of FIG. 23 has a trading system 50 on the first order book side and as trading system 60 on the second order book side.

Trading System on the First Order Book Side

The system 50 on the first order book side is a system for conducting transactions upon use of a first order book on which economic value of a commodity is presented as evaluated prices in terms of currency per unit of the commodity in the same manner as at the conventional commodity exchanges (for example, transactions upon use of the first order book on which yen prices per 1 g of the commodity are presented), and has a first order-accepting means [1ST OA] 51, a first order-information storage [1ST OIS] 52, an order book I creating means [OB1C] 53, a first matched-order identifying means [1ST MOI] 54, and a first transaction executing means [1ST TE] 55.

First Order-Accepting Means

The first order-accepting means 51 is configured to display on a screen quote prices of such commodity as that traded at major commodity exchanges per minimum unit quantity of the commodity (in the example of FIG. 23, 1 gram is defined as a unit quantity for convenience), and to accept trading orders for the commodity at certain prices per minimum unit quantity of the commodity.

For quote prices of the same commodity as that traded at the major exchanges per minimum unit quantity of the commodity, there may be used those prices when arbitrage (trading behavior for making a profit by selling a commodity on an order book on which the price is relatively high and buying the commodity on an order book on which the price is relatively low in the situation where temporary price difference of the commodity having identical economic value is caused between a plurality of order books, and then, when the price difference is decreased, conducting reverse trading) function works or a price predetermined by the provider of the system on the basis of the price of the commodity traded at the major exchanges.

Regarding the display format at the first order-accepting means 51, either of the order book format containing both of the ask price and the bid price and the 2-way method showing only the ask price and the bid price is applicable.

First Order-Information Storage

The first order-information storage 52 includes a database system provided with database files, and is configured to store order information on the trading orders for the commodity accepted by the first order-accepting means 51 upon sorting the orders by price and order time for each of sell orders and buy orders.

Order Book I Creating Means

The order book I creating means 53 is configured to read out the order information on trading orders for the commodity stored in the first order-information storage 52, to count ordered quantity at each price, and to create a first order book on which the ordered quantities as counted are listed in order of price.

First Matched-Order Identifying Means

The first matched-order identifying means 54 is configured to compare sell orders against buy orders on the first order book created by the order book I creating means 53, to specify a price range in which sell prices and buy prices match, and to identify matched orders in the specified price range.

First Transaction Executing Means

The first transaction executing means 55 is configured to have, out of the order information stored in the first order-information storage 52, an ordered quantity of sell orders or buy orders that are identified as matched orders by the first matched-order identifying means 43 executed in order of price (in the case of sell order, in ascending order, and in the case of buy order, in descending order) and in the order of earlier to later order time, and to update the order information stored in the first order-information storage 52 so that order information corresponding to the executed sell orders or buy orders shows "already executed" status.

The trading system 50 on the first order book side locks the first order-information storage 52 until the processing from storage of the order information by the first order-information storage 52 through order execution and update of the first order-information storage 52 by the first transaction executing means 54 is completed, and, after update of the first order-information storage 52 by the first transaction executing means 54, releases the lock. Then, when a very short time of less than a second lapses, the trading system 50 on the first order book side repeats processing from storage of order information by the first order-information storage 52 upon newly adding trading orders accepted by the first order-accepting means 51 through order execution and update of the first order-information storage 52 by the first transaction executing means 54.

Trading System on the Second Order Book Side

The trading system 60 on the second order book side is a system for conducting ultra-small transactions of a commodity as digital assets upon use of a second order book on which economic value of the commodity is presented in terms of amount of commodity tokens, which is less than minimum unit quantity of the commodity, per unit of currency (for example, transactions upon use of the second order book on which weight in grams of the commodity per 1 yen is presented), and has a second order-accepting means [2ND OA] 61, a second order-information storage [2ND OIS] 62, an order book II creating means [OB2C] 63, a second matched-order identifying means [2ND MOI] 64, and a second transaction executing means [2ND TE] 65.

Second Order-Accepting Means

The second order-accepting means 61 is configured to display on a screen quote amounts of commodity tokens, which are less than minimum unit quantity of the commodity, per unit amount of a currency, and to accept trading orders for the commodity tokens at certain amounts of commodity tokens per minimum unit amount of the currency.

Regarding the display format at the second order-accepting means 61, either of the order book format containing both of the ask amount and the bid amount and the 2-way method showing only the ask amount and the bid amount is applicable.

Second Order-Information Storage

The second order-information storage 62 includes a database system provided with database files, and is configured to store order information on the trading orders for commodity tokens accepted by the second order-accepting means 61 upon sorting the orders by amount of commodity tokens per unit amount of the currency and order time for each of sell orders and buy orders.

Order Book II Creating Means

The order book II creating means 63 is configured to read out the order information on trading orders for commodity tokens stored in the second order-information storage 62, to count ordered quantity at each amount of commodity tokens per unit amount of the currency, and to create a second order book on which the ordered quantities as counted are listed in order of amount of commodity tokens per unit amount of the currency.

Second Matched-Order Identifying Means

The second matched-order identifying means 64 is configured to compare sell orders against buy orders on the second order book created by the order book II creating means 63, to specify a price range in which sell prices and buy prices match, and to identify matched orders in the specified price range.

Second Transaction Executing Means

The second transaction executing means 65 is configured to have, out of the order information stored in the second order-information storage 62, an ordered quantity of sell orders or buy orders that are identified as matched orders by the second matched-order identifying means 64 executed in order of amount of commodity tokens (in the case of sell order, in descending order, and in the case of buy order, in ascending order) and in the order of earlier to later order time, and to update the order information stored in the second order-information storage 62 so that order information corresponding to the executed sell orders or buy orders shows "already executed" status.

The trading system 60 locks the second order-information storage 62 until the processing from storage of the order information by the second order-information storage 62 through order execution and update of the second order-information storage 62 by the second transaction executing means 64 is completed, and, after update of the second order-information storage 62 by the second transaction executing means 64, releases the lock. Then, when a very short time of less than a second lapses, the trading system 60 on the second order book side repeats processing from storage of order information by the second order-information storage 62 upon newly adding trading orders accepted by the second order-accepting means 61 through order execution and update of the second order-information storage 62 by the second transaction executing means 64.

With a settlement processing system having these trading systems 50 and 60 being built, orders are managed by order book method in the respective trading systems. For example, there would exist both of a first order book that presents prices in yen per 1 gram of a commodity and a second order book that presents amounts in grams of commodity tokens per 1 yen, and comparison of orders and identification of matched orders are conducted on these order books separately. This would run the risk of causing price divergence and poor liquidity between the first order book and the second order book.

Therefore, the present inventor next discussed and examined building of a configuration that allows arbitrage function to work, to improve mutual liquidity so that value is linked between the first order book and the second order book in the settlement processing system making use of digital assets of FIG. 23.

Figure 24:
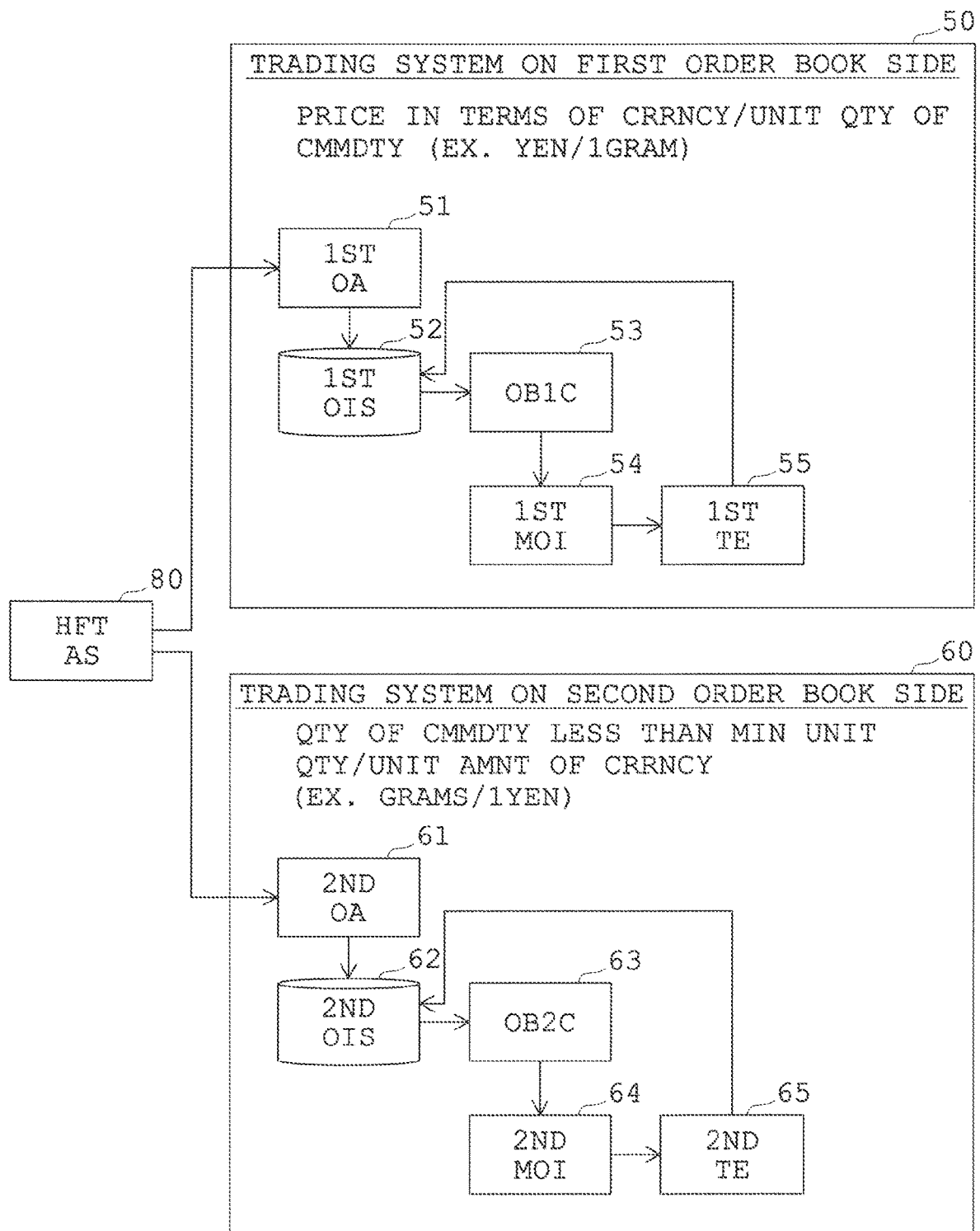
FIG. 24 is an explanatory diagram that schematically shows the overall configuration of one example of the settlement processing system that the present inventor discussed and examined next at the stage before deriving the present invention.

Settlement Processing System Making Use of Digital Assets that the Present Inventor Discussed and Examined Next at the Stage Before Deriving the Present Invention FIG. 24 is an explanatory diagram that schematically shows the overall configuration of one example of the settlement processing system that the present inventor discussed and examined next at the stage before deriving the present invention.

The settlement processing system of FIG. 24 has an HFT arbitrage system 80 in addition to the configuration of the settlement processing system shown in FIG. 23.

The HFT arbitrage system 80 is configured so that arbitrage function works between the trading system 50 on the first order book side and the trading system 60 on the second order book side.

However, it was found that, in the configuration made to have an HFT arbitrage system 80 as in the trading system of FIG. 24, the following problem would occur in the trading system 60 on the second order book side.

Settlements should be processed so that transactions such as purchase of a commodity are completed in real time.

As a matter of course, it is necessary to conduct a settlement instantly while maintaining reasonableness of the price. It is necessary to keep continuity of "conducting a settlement instantly while maintaining reasonableness of the price".

Reasonableness of the price can be assured from constant reference to the trading price at the major markets (famous exchanges) by the trading system 50 on the first order book side (the general theory that prices for large transactions are reasonable).

To be specific, arbitrage function by HFT (high-frequency (ultra-high speed) trading action performed at very short intervals in the order of milliseconds or so) built in HFT arbitrage systems (not shown) of major traders works between individual order books at external major exchanges (major exchanges in the world) and the first order book in the trading system 50 on the first order book side, to link the price to that at the major exchanges and thus reasonableness of price is assured.

In the trading system 50 on the first order book side, transactions are conducted for prices per minimum unit quantity (in the example of FIG. 23, one unit quantity) of the same commodity as that traded at the major exchanges. There scarcely being a difference in economic value per single ordered quantity between the trading system 50 on the first order book side and the major exchanges, an enormously large ordered quantity is not necessitated in the trading system 50 on the first order book side, and thus the frequency of arbitrage is very low in comparison with arbitrage between the trading system 50 on the first order book side and the trading system 60 on the second order book side via the HET arbitrage system 80.

A settlement in a currency can be immediately conducted because the economic value of the currency itself is guaranteed by a country or region.

Processing for a settlement in an economically valuable digital asset other than a currency should not be stopped or delayed, as processing for settlement in a currency should not.

For building a system that allows for transactions "to be settled in a currency" and transactions "to be settled in economically valuable thing other than a currency", it is necessary to implement the above-mentioned two order books (the first order book and the second order book) and to provide an HFT arbitrage system 80 shown in FIG. 24 so that, other than arbitrage by HFT between respective order books in external major exchanges and the first order book in the trading system 50 on the first order book side, high-speed arbitrage function is involved between these two order books (the first order book and the second order book) to assure price linkage between these order books.

The second order book is to present the economic value of less than minimum unit quantity of the commodity in terms of amount of commodity tokens per unit amount of currency. On this book, the economic value of commodity tokens per order is extremely low in comparison with the economic value of the commodity as evaluated prices in terms of currency per unit of the commodity as on the first order book.

In order to obtain economic value equivalent to the economic value per single ordered quantity on the first order book, an enormously large ordered quantity is needed on the second order book.

Since the price of commodity or commodity token fluctuates in a very short period of time, even if orders with an enormously large ordered quantity for commodity tokens are placed as a bulk at one time on the trading system on the second order book side, it is difficult to match and execute all of these enormously large ordered quantity for commodity tokens.

In order to prevent slippage in arbitrage on these order books (the first order book and the second order book) or occurrence of slippage because of failure of arbitrage owing to abrupt change in price, a large number of smallest (ordered quantity per order is the minimum transaction unit) orders are placed at very short intervals via HFT processing by the trading system between the two order books (the first order book and the second border book).

When arbitrage is made between the trading system 50 on the first order book side and the trading system 60 on the second order book side, orders with minute ordered quantity would be repeatedly placed an enormous number of times in the trading system 60 on the second order book side.

As a result, the data transaction accompanying order placement in the trading system 60 on the second order book side grows enormous, to increase the load on the system and stagnate the processing.

Furthermore, even if orders are miniaturized, price fluctuation of commodities or commodity tokens in a very short period could not be followed, to cause slippage, or a gap between a price at order placement and a price at actual execution, and thus re-ordering tends to be repeated.

In addition, since trading in the trading system on the second order book side is based on the minimum unit of a currency as stated above, ordered quantity is likely to be enormous. As the number of settlements increases in the trading system on the second order book side, enormously large volume of system transactions occur between the two order books (the first order book and the second order book), to necessitate investing in building of a system having a scale sufficient to deal with such enormously large volume of transactions, which results in enormous amount of cost.

In particular, on both of the second order book and the first order book, fluctuation in settlement and price change at the market constantly occur, and thus brands having higher liquidity more easily cause an enormous number of minimum unit data transactions (arbitrage by HFT (the operation of HFT arbitrage system 80 shown in FIG. 24) other than arbitrage between individual order books at external major exchanges and the first order book).

As a result of consideration, discussion and examination of this problem, the present inventor has derived a settlement processing system, a settlement processing method, a settlement processing program, and a computer-readable recording medium on which the settlement processing program is recorded according to the present invention, each of which makes use of digital assets.

A settlement processing system making use of digital assets according to the present invention includes: a first order-accepting means, which displays on a screen quote prices of same commodity as that traded at major commodity exchanges per minimum unit quantity of the commodity and accepts trading orders for the commodity at certain prices per minimum unit quantity of the commodity; a first order-information storage, which stores order information on the trading orders for the commodity accepted by the first order-accepting means upon sorting the orders by price and order time for each of sell and buy; a second order-accepting means, which displays on a screen quote amounts of commodity tokens per unit amount of a currency, which are less than a minimum unit quantity of the commodity, and accepts trading orders for commodity tokens at certain amounts of commodity tokens per unit amount of the currency; a second order-information storage, which stores order information on the trading orders for commodity tokens accepted by the second order-accepting means upon sorting the orders by amount of commodity tokens and order time for each of sell and buy; an order book I creating means, which reads out the order information on the trading orders for the commodity stored in the first order-information storage, counts ordered quantity at each price, and creates a first order book on which the ordered quantities as counted are listed in order of price; an order book II creating means, which reads out the order information on the trading orders for the commodity tokens stored in the second order-information storage, counts ordered quantity at each amount of commodity tokens, and creates a second order book on which the ordered quantities as counted are listed in order of amount of commodity tokens; a data format converting means, which creates a converted second order book by converting a data format of the second order book created by the order book II creating means into a same format as that of the first order book; a composite order book creating means, which creates a composite order book by merging the first order book created by the order book I creating means and the converted second order book created by the data format converting means in such a manner that order information is sorted by price; an ordered-quantity total value calculating means, which calculates a total value of ordered quantity up to or down to each price for each of sell and buy on the composite order book; an ordered-quantity total value separating means, which separates the total value of ordered quantity at each price for each of sell and buy, which is calculated by the ordered-quantity total value calculating means, into a first total value that is a largest integer multiple of a minimum trading unit on the first order book equal to or smaller than the total value of ordered quantity itself and a second total value as a remaining value after subtraction of the first total value; a first matched-order identifying means, which compares sell orders against buy orders on the composite order book, to specify a price range in which prices for sell orders and prices for buy orders match and to identify, in the price range as specified, an equal ordered quantity, which is smaller one of the respective first total values of sell orders and buy orders, of sell orders and buy orders as matched orders; a first data format reconverting means, which reconverts, out of the orders identified by the first matched-order identifying means as matched orders on the composite order book, sell orders or buy orders that are derived from the converted second order book to have a same data format as that of the second order book; a first transaction executing means, which makes, out of the order information stored in the first order-information storage, sell orders or buy orders that are derived from the first order book and identified by the first matched-order identifying means as matched orders on the composite order book executed in order of order price and in order of earlier to later order time, updates the first order-information storage so that order information corresponding to the executed sell orders or buy orders shows "already executed" status, makes, out of the order information stored in the second order-information storage, sell orders or buy orders that are derived from the converted second order book and identified by the first matched-order identifying means as matched orders on the composite order book and then reconverted by the first data format reconverting means to have the same data format as that of the second order book executed in order of amount of commodity tokens per unit amount of the currency and in order of earlier to later order time, and updates the second order-information storage so that order information corresponding to the executed sell orders or buy orders shows "already executed" status; a composite order book updating means, which updates the composite order book by subtracting the equal ordered quantity of sell orders and buy orders identified as matched orders by the first matched-order identifying means and made executed via the first transaction executing means from the ordered quantity where the price is matched and the total value of ordered quantity respectively for each of sell and buy on the composite order book; a second matched-order identifying means, which compares sell orders against buy orders on the composite order book updated by the composite order-book updating means, to specify a price range in which prices for sell orders and prices for buy orders match and to identify, in the price range as specified, an equal ordered quantity, which is smaller one of the respective second total values of sell orders and buy orders, of sell orders and buy orders as matched orders; a second data format reconverting means, which reconverts, out of the orders identified by the second matched-order identifying means as matched orders on the composite order book, sell orders or buy orders that are derived from the converted second order book to have the same data format as that of the second order book; and a second transaction executing means, which makes, out of the order information stored in the second order-information storage, sell orders or buy orders that are derived from the converted second order book, identified by the second matched-order identifying means as matched orders on the composite order book and then reconverted to have the same data format as that of the second order book by the second data format reconverting means executed in order of amount of commodity tokens per unit amount of the currency and in order of earlier to later order time, and updates the second order-information storage so that order information corresponding to the executed sell orders or buy orders shows "already executed" status.

Also, a settlement processing method according to the present invention is a method in a settlement processing system that makes use of digital assets and is configured to have a computer and software provided for the computer. The settlement processing method includes: a first order-accepting step of displaying on a screen quote prices of same commodity as that traded at major commodity exchanges per minimum unit quantity of the commodity and accepting trading orders for the commodity at certain prices per minimum unit quantity of the commodity; a first order-information storing step of storing in a first order-information storage order information on the trading orders for the commodity accepted at the first order-accepting step upon sorting the orders by price and order time for each of sell and buy; a second order-accepting step of displaying on a screen quote amounts of commodity tokens per unit amount of a currency, which are less than minimum unit quantity of the commodity, and accepting trading orders for commodity tokens at certain amounts of commodity tokens per unit amount of the currency; a second order-information storing step of storing in a second order-information storage order information on the trading orders for commodity tokens accepted at the second order-accepting step upon sorting the orders by amount of commodity tokens and order time for each of sell and buy; an order book I creating step of reading out the order information on the trading orders for the commodity stored in the first order-information storage, counting ordered quantity at each price, and creating a first order book on which the ordered quantities as counted are listed in order of price; an order book II creating step of reading out the order information on the trading orders for the commodity tokens stored in the second order-information storage, counting ordered quantity at each amount of commodity tokens, and creating a second order book on which the ordered quantities as counted are listed in order of amount of commodity tokens; a data format converting step of creating a converted second order book by converting a data format of the second order book created at the order book II creating step into a same format as that of the first order book; a composite order book creating step of creating a composite order book by merging the first order book created at the order book I creating step and the converted second order book created at the data format converting step in such a manner that order information is sorted by price; an ordered-quantity total value calculating step of calculating a total value of ordered quantity up to or down to each price for each of sell and buy on the composite order book; an ordered-quantity total value separating step of separating the total value of ordered quantity at each price for each of sell and buy, which is calculated at the ordered-quantity total value calculating step, into a first total value that is a largest integer multiple of a minimum trading unit on the first order book equal to or smaller than the total value of ordered quantity itself and a second total value as a remaining value after subtraction of the first total value; a first matched-order identifying step of comparing sell orders against buy orders on the composite order book, to specify a price range in which prices for sell orders and prices for buy orders match and to identify, in the price range as specified, an equal ordered quantity, which is smaller one of the respective first total values of sell orders and buy orders, of sell orders and buy orders as matched orders; a first data format reconverting step of reconverting, out of the orders identified at the first matched-order identifying step as matched orders on the composite order book, sell orders or buy orders that are derived from the converted second order book to have a same data format as that of the second order book; a first transaction executing step of making, out of the order information stored in the first order-information storage, sell orders or buy orders that are derived from the first order book and identified at the first matched-order identifying step as matched orders on the composite order book executed in order of order price and in order of earlier to later order time, updating the first order-information storage so that order information corresponding to the executed sell orders or buy orders shows "already executed" status, making, out of the order information stored in the second order-information storage, sell orders or buy orders that are derived from the converted second order book and identified at the first matched-order identifying step as matched orders on the composite order book and then reconverted at the first data format reconverting step to have the same data format as that of the second order book executed in order of amount of commodity tokens per unit amount of the currency and in order of earlier to later order time, and updating the second order-information storage so that order information corresponding to the executed sell orders or buy orders shows "already executed" status; a composite order book updating step of updating the composite order book by subtracting the equal ordered quantity of sell orders and buy orders identified as matched orders at the first matched-order identifying step and made executed at the first transaction executing step from the ordered quantity where the price is matched and the total value of ordered quantity respectively for each of sell and buy on the composite order book; a second matched-order identifying step of comparing sell orders against buy orders on the composite order book updated at the composite order-book updating step, to specify a price range in which prices for sell orders and prices for buy orders match and to identify, in the price range as specified, an equal ordered quantity, which is smaller one of the respective second total values of sell orders and buy orders, of sell orders and buy orders as matched orders; a second data format reconverting step of reconverting, out of the orders identified at the second matched-order identifying step as matched orders on the composite order book, sell orders or buy orders that are derived from the converted second order book to have the same data format as that of the second order book; and a second transaction executing step of making, out of the order information stored in the second order-information storage, sell orders or buy orders that are derived from the converted second order book, identified at the second matched-order identifying step as matched orders on the composite order book and then reconverted to have the same data format as that of the second order book at the second data format reconverting step executed in order of amount of commodity tokens per unit amount of the currency and in order of earlier to later order time, and updating the second order-information storage so that order information corresponding to the executed sell orders or buy orders shows "already executed" status.

Also, a settlement processing program according to the present invention is a program in a settlement processing system that makes use of digital assets and is configured to have a computer and software provided for the computer. The settlement processing program makes the computer execute: a first order-accepting step of displaying on a screen quote prices of same commodity as that traded at major commodity exchanges per minimum unit quantity of the commodity and accepting trading orders for the commodity at certain prices per minimum unit quantity of the commodity; a first order-information storing step of storing in a first order-information storage order information on the trading orders for the commodity accepted at the first order-accepting step upon sorting the orders by price and order time for each of sell and buy; a second order-accepting step of displaying on a screen quote amounts of commodity tokens per unit amount of a currency, which are less than minimum unit quantity of the commodity, and accepting trading orders for commodity tokens at certain amounts of commodity tokens per unit amount of the currency; a second order-information storing step of storing in a second order-information storage order information on the trading orders for commodity tokens accepted at the second order-accepting step upon sorting the orders by amount of commodity tokens and order time for each of sell and buy; an order book I creating step of reading out the order information on the trading orders for the commodity stored in the first order-information storage, counting ordered quantity at each price, and creating a first order book on which the ordered quantities as counted are listed in order of price; an order book II creating step of reading out the order information on the trading orders for the commodity tokens stored in the second order-information storage, counting ordered quantity at each amount of commodity tokens, and creating a second order book on which the ordered quantities as counted are listed in order of amount of commodity tokens; a data format converting step of creating a converted second order book by converting a data format of the second order book created at the order book II creating step into a same format as that of the first order book; a composite order book creating step of creating a composite order book by merging the first order book created at the order book I creating step and the converted second order book created at the data format converting step in such a manner that order information is sorted by price; an ordered-quantity total value calculating step of calculating a total value of ordered quantity up to or down to each price for each of sell and buy on the composite order book; an ordered-quantity total value separating step of separating the total value of ordered quantity at each price for each of sell and buy, which is calculated at the ordered-quantity total value calculating step, into a first total value that is a largest integer multiple of a minimum trading unit on the first order book equal to or smaller than the total value of ordered quantity itself and a second total value as a remaining value after subtraction of the first total value; a first matched-order identifying step of comparing sell orders against buy orders on the composite order book, to specify a price range in which prices for sell orders and prices for buy orders match and to identify, in the price range as specified, an equal ordered quantity, which is smaller one of the respective first total values of sell orders and buy orders, of sell orders and buy orders as matched orders; a first data format reconverting step of reconverting, out of the orders identified at the first matched-order identifying step as matched orders on the composite order book, sell orders or buy orders that are derived from the converted second order book to have a same data format as that of the second order book; a first transaction executing step of making, out of the order information stored in the first order-information storage, sell orders or buy orders that are derived from the first order book and identified at the first matched-order identifying step as matched orders on the composite order book executed in order of order price and in order of earlier to later order time, updating the first order-information storage so that order information corresponding to the executed sell orders or buy orders shows "already executed" status, making, out of the order information stored in the second order-information storage, sell orders or buy orders that are derived from the converted second order book and identified at the first matched-order identifying step as matched orders on the composite order book and then reconverted at the first data format reconverting step to have the same data format as that of the second order book executed in order of amount of commodity tokens per unit amount of the currency and in order of earlier to later order time, and updating the second order-information storage so that order information corresponding to the executed sell orders or buy orders shows "already executed" status; a composite order book updating step of updating the composite order book by subtracting the equal ordered quantity of sell orders and buy orders identified as matched orders at the first matched-order identifying step and made executed at the first transaction executing step from the ordered quantity where the price is matched and the total value of ordered quantity respectively for each of sell and buy on the composite order book; a second matched-order identifying step of comparing sell orders against buy orders on the composite order book updated at the composite order-book updating step, to specify a price range in which prices for sell orders and prices for buy orders match and to identify, in the price range as specified, an equal ordered quantity, which is smaller one of the respective second total values of sell orders and buy orders, of sell orders and buy orders as matched orders; a second data format reconverting step of reconverting, out of the orders identified at the second matched-order identifying step as matched orders on the composite order book, sell orders or buy orders that are derived from the converted second order book to have the same data format as that of the second order book; and a second transaction executing step of making, out of the order information stored in the second order-information storage, sell orders or buy orders that are derived from the converted second order book, identified at the second matched-order identifying step as matched orders on the composite order book and then reconverted to have the same data format as that of the second order book at the second data format reconverting step executed in order of amount of commodity tokens per unit amount of the currency and in order of earlier to later order time, and updating the second order-information storage so that order information corresponding to the executed sell orders or buy orders shows "already executed" status.

Also, a computer-readable recording medium according to the present invention is configured to record the above-mentioned settlement processing program of the present invention.

If, as in the settlement processing system making use of digital assets according to the present invention, the configuration is made so that: a data format converting means creates a converted second order book by converting a data format of the second order book into a same format as that of the first order book; a composite order book creating means creates a composite order book by merging the first order book and the converted second order book; an ordered-quantity total value calculating means calculates a total value of ordered quantity up to or down to each price for each of sell and buy on the composite order book; an ordered-quantity total value separating means separates the total value of ordered quantity at each price for each of sell and buy into a first total value that is a largest integer multiple of a minimum trading unit on the first order book equal to or smaller than the total value of ordered quantity itself and a second total value as a remaining value after subtraction of the first total value; a first matched-order identifying means compares sell orders against buy orders on the composite order book, to specify a price range in which prices for sell orders and prices for buy orders match and to identify, in the price range as specified, an equal ordered quantity, which is smaller one of the respective first total values of sell orders and buy orders, of sell orders and buy orders as matched orders; a first data format reconverting means reconverts, out of the orders identified by the first matched-order identifying means as matched orders on the composite order book, sell orders or buy orders that are derived from the converted second order book to have a same data format as that of the second order book; a first transaction executing means makes, out of the order information stored in a first order-information storage, sell orders or buy orders that are derived from the first order book and identified by the first matched-order identifying means as matched orders on the composite order book executed in order of order price and in order of earlier to later order time, updates the first order-information storage so that order information corresponding to the executed sell orders or buy orders shows "already executed" status, makes, out of the order information stored in the second order-information storage, sell orders or buy orders that are derived from the converted second order book and identified by the first matched-order identifying means as matched orders on the composite order book and then reconverted by the first data format reconverting means to have the same data format as that of the second order book executed in order of amount of commodity tokens per unit amount of the currency and in order of earlier to later order time, and updates the second order-information storage so that order information corresponding to the executed sell orders or buy orders shows "already executed" status; a composite order book updating means updates the composite order book by subtracting the equal ordered quantity of sell orders and buy orders identified as matched orders by the first matched-order identifying means and made executed via the first transaction executing means from the ordered quantity where the price is matched and the total value of ordered quantity respectively for each of sell and buy on the composite order book; a second matched-order identifying means compares sell orders against buy orders on the composite order book updated by the composite order-book updating means, to specify a price range in which prices for sell orders and prices for buy orders match and to identify, in the price range as specified, an equal ordered quantity, which is smaller one of the respective second total values of sell orders and buy orders, of sell orders and buy orders as matched orders; a second data format reconverting means reconverts, out of the orders identified by the second matched-order identifying means as matched orders on the composite order book, sell orders or buy orders that are derived from the converted second order book to have the same data format as that of the second order book; and a second transaction executing means makes, out of the order information stored in the second order-information storage, sell orders or buy orders that are derived from the converted second order book, identified by the second matched-order identifying means as matched orders on the composite order book and then reconverted to have the same data format as that of the second order book by the second data format reconverting means executed in order of amount of commodity tokens per unit amount of the currency and in order of earlier to later order time, an enormous number of orders on the system 60 on the second order book side, which are needed to be matched with one order on the system 50 on the first order book side in the settlement processing system making use of digital assets shown in FIG. 24, could be executed through the matching process on one composite order book. That is, the enormously load-bearing function to assure price linkage between the first order book and the second order book provided by HFT arbitrage system 80 shown in FIG. 24 can be dispensed with.

Therefore, according to the present invention, it is possible to obtain a settlement processing system, a settlement processing method, a settlement processing program, and a computer-readable recording medium on which the settlement processing program is recorded, each of which, making use of digital assets, makes it possible to conduct transactions, in the same manner as conventionally done at the major commodity exchanges in the world, with use of a first order book on which economic value of a commodity is presented as prices evaluated in terms of currency per unit amount of the commodity, and to conduct ultra-small transactions of the commodity as digital assets, which have not been conducted at the major commodity exchanges in the world, with use of a second order book on which economic value of less than minimum unit quantity of the commodity is presented in terms of amount of commodity tokens per unit amount of a currency, and makes it possible to conduct smooth transactions upon assuring price linkage between the first order book and the second order book and trading liquidity between the order books while preventing the load on the system domain from growing enormously because of involvement of arbitrage function by HFT.

The mode for carrying out the present invention will be explained in reference to the drawings.

First Embodiment Mode

FIG. 1 is an explanatory diagram that schematically shows the overall configuration of the settlement processing system making use of digital assets according to the first embodiment mode of the present invention.

The settlement processing system making use of digital assets of the first embodiment mode has a first order-accepting means (1ST OA) 1, a first order-information storage (1ST OIS) 2, a second order-accepting means (2ND OA) 3, a second order-information storage (2ND OIS) 4, an order book I creating means (OB1C) 5, an order book II creating means (OB2C) 6, a data format converting means (DFC) 7, a composite order book creating means (COBC) 8, an ordered-quantity total value calculating means (OQTVC) 9, an ordered-quantity total value separating means (OQTVS) 10, a first matched-order identifying means (1ST MOI) 11, a first data format reconverting means (1ST DFRC) 12, a first transaction executing means (1ST TE) 13, a composite order book updating means (COBU) 14, a second matched-order identifying means (2ND MOI) 15, a second data format reconverting means (2ND DFRC) 16, and a second transaction executing means (2ND TE) 17. These components are, unlike the trading system 50 on the first order book side and the trading system 60 on the second order book side in the settlement processing systems shown in FIG. 23 or FIG. 24, built into a system in which matched orders are identified on the composite order book, into which the first order book and the second order book are merged, so that orders on the first order book can be executed with orders on the second order book.

Figure 2:
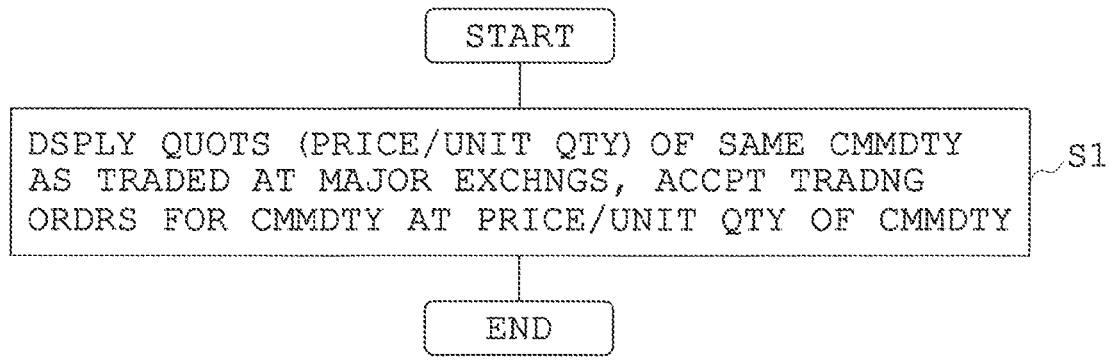
FIG. 2 is a flowchart the shows one example of processing outline by the first order-accepting means in the settlement processing system making use of digital assets of FIG. 1.
Figure 3:
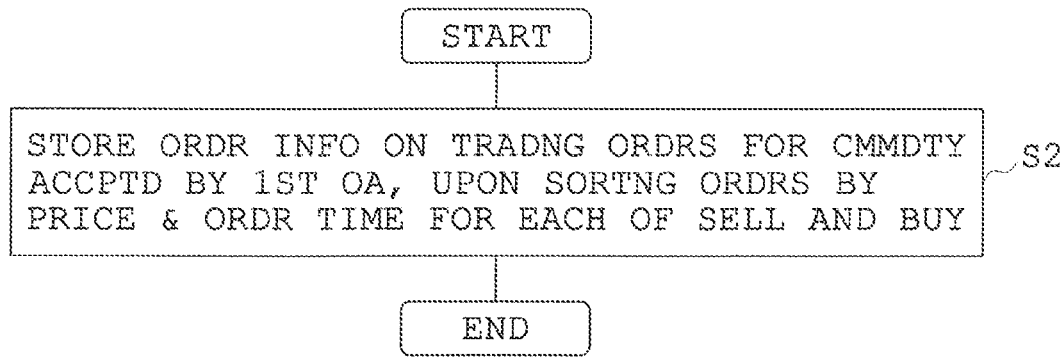
FIG. 3 is a flowchart that shows one example of processing outline by the first order-information storage in the settlement processing system making use of digital assets of FIG. 1.
Figure 4:
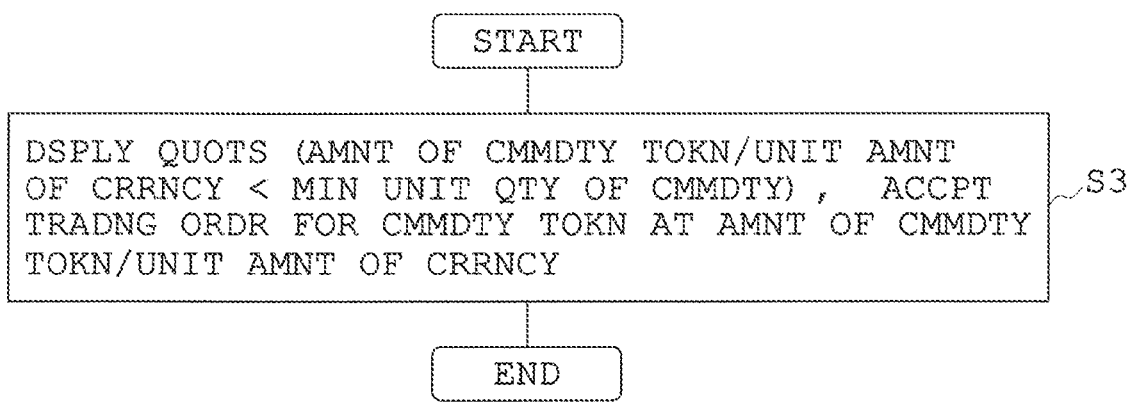
FIG. 4 is a flowchart that shows one example of processing outline by the second order-accepting means in the settlement processing system making use of digital assets of FIG. 1.

First Order-Accepting Means, First Order-Information Storage, Order Book I Creating Means The first order-accepting means 1, the first order-information storage 2, and the order book I creating means 5 are respectively configured substantially in the same manner as the first order-accepting means 51, the first order-information storage 52, and the order book I creating means 53 in the trading system 50 on the first order book side shown in FIG. 23 or FIG. 24 (See FIGS. 2, 3 and 4, Steps S1, S2 and S3).

Figure 5:
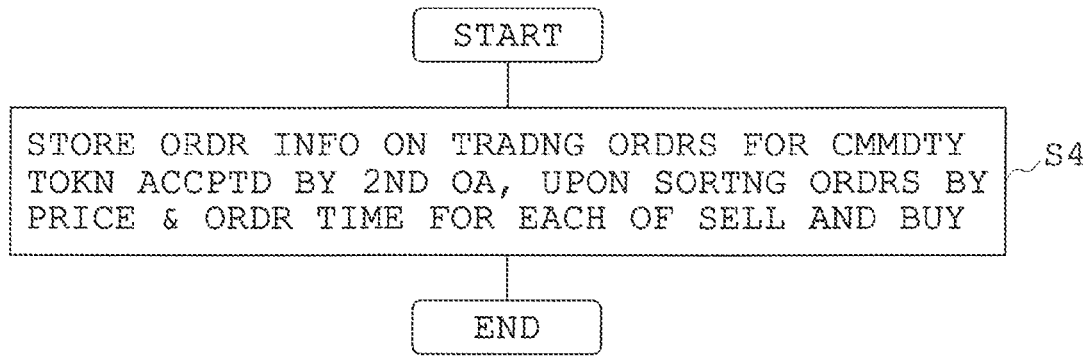
FIG. 5 is a flowchart that shows one example of processing outline by the second order-information storage in the settlement processing system making use of digital assets of FIG. 1.
Figure 6:
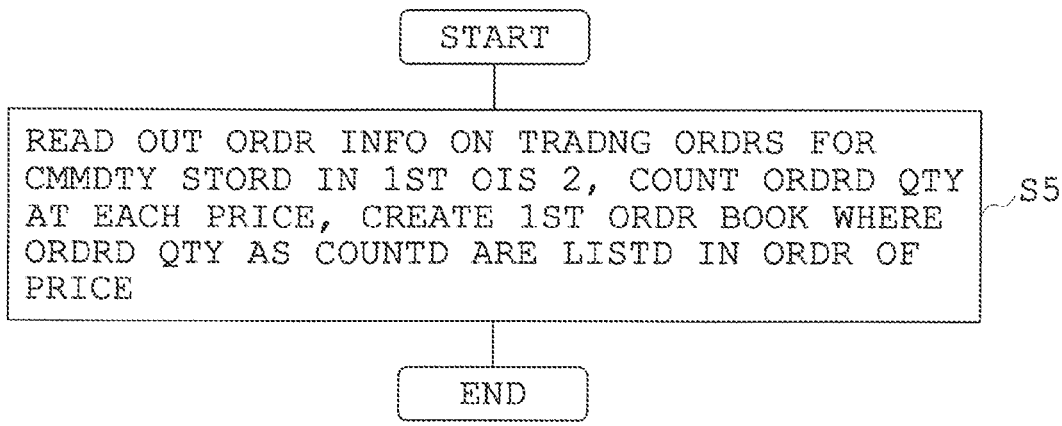
FIG. 6 is a flowchart that shows one example of processing outline by the order book I creating means in the settlement processing system making use of digital assets of FIG. 1.
Figure 7:
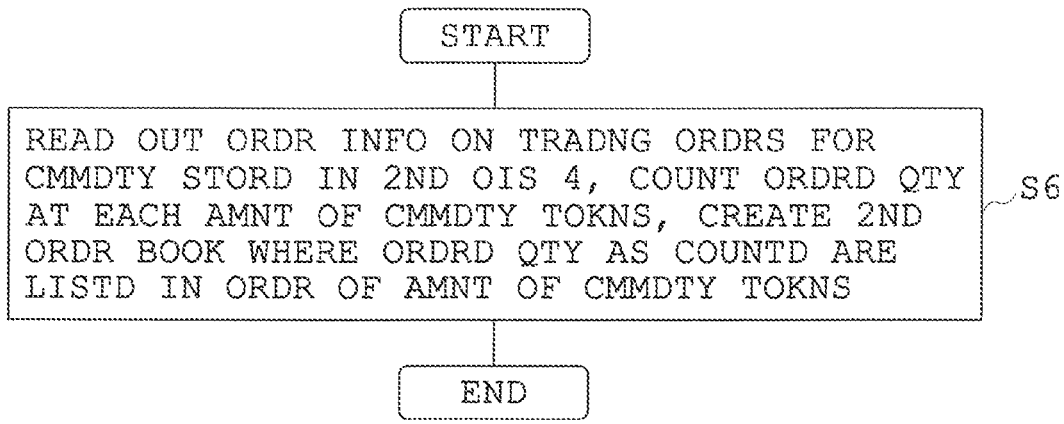
FIG. 7 is a flowchart that show one example of processing outline by the order book II creating means in the settlement processing system making use of digital assets of FIG. 1.

Second Order-Accepting Means, Second Order-Information Storage, Order Book II Creating Means The second order-accepting means 3, the second order-information storage 4, and the order book II creating means 6 are respectively configured substantially in the same manner as the second order-accepting means 61, the second order-information storage 62, and the order book II creating means 63 in the trading system 60 on the second order book side shown in FIG. 23 or FIG. 24 (See FIGS. 5, 6 and 7, Steps S4, S5 and S6).

Data Format Converting Means

Figure 8:
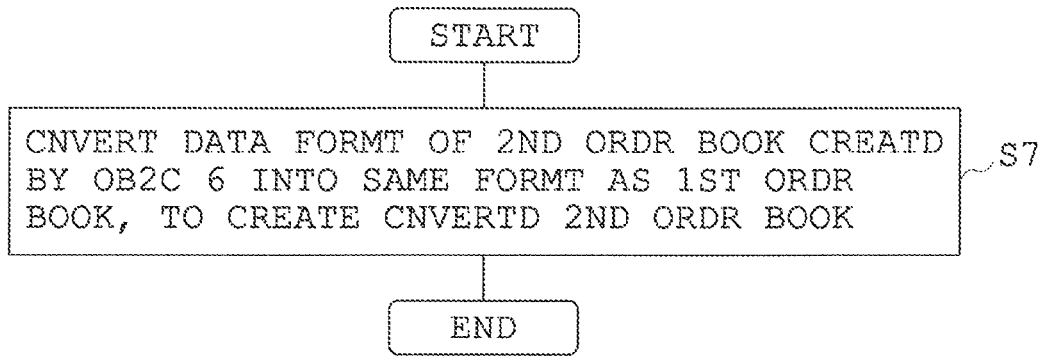
FIG. 8 is a flowchart that shows one example of processing outline by the data format converting means in the settlement processing system making use of digital assets of FIG. 1.

The data format converting means 7 is configured to convert the data format of the second order book created by the order book II creating means 6 into the same format as that of the first order book, to create the converted second order book (See FIG. 8, Step S7).

The data format conversion of the second order book is done by, for example, reciprocalizing the quantity (weight) in grams of a commodity per yen (solution: price in yen per gram of the commodity) and dividing by the reciprocal (multiplying by the quantity in grams per yen) the ordered quantity.

After conversion of the data format, the items are sorted by price (descending order) as in the first order book. It may be configured so that numerical figures after the decimal point in the reciprocal is rounded up or down to a certain decimal place.

Composite Order Book Creating Means

Figure 9:
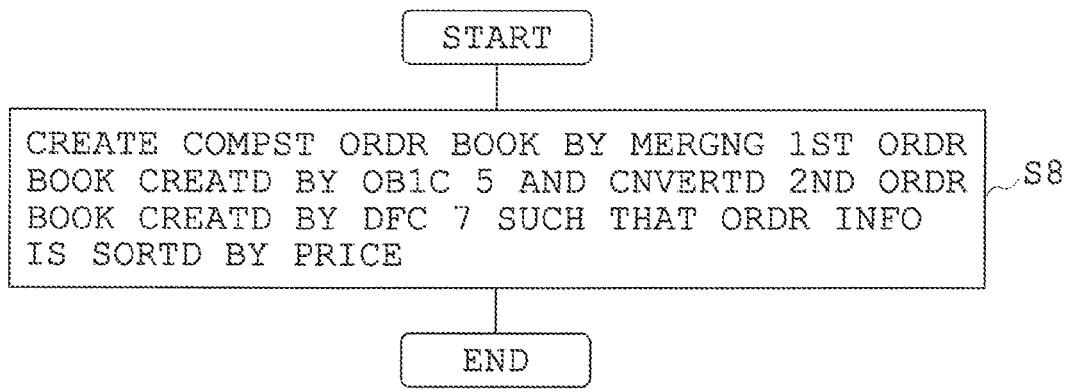
FIG. 9 is a flowchart that shows one example of processing outline by the composite order book creating means in the settlement processing system making use of digital assets of FIG. 1.

The composite order book creating means 8 is configured to create a composite order book by merging the first order book created by the order book I creating means 5 and the converted second order book created by the data format converting means 7 in such a manner that order information is sorted by price (descending order as in the first order book) (See FIG. 9, Step S8).

Ordered-Quantity Total Value Calculating Means

Figure 10:
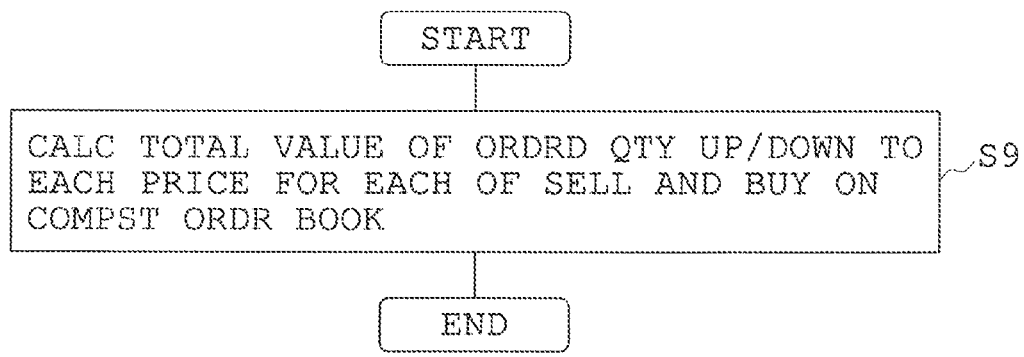
FIG. 10 is a flowchart that shows one example of processing outline by the ordered-quantity total value calculating means in the settlement processing system making use of digital assets of FIG. 1.

The ordered-quantity total value calculating means 9 is configured to calculate a total value of ordered quantity up to or down to each price for each of sell and buy on the composite order book (See FIG. 10, Step S9).

Ordered-Quantity Total Value Separating Means

Figure 11:
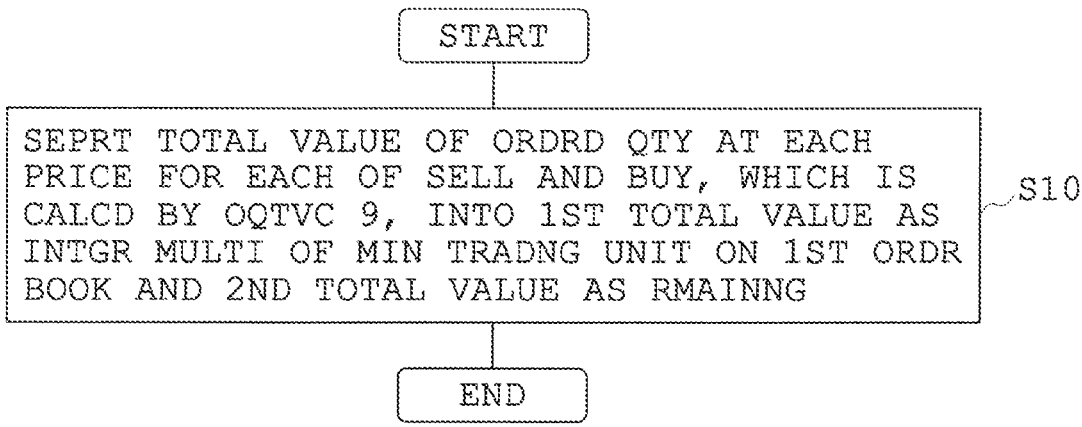
FIG. 11 is a flowchart that shows one example of processing outline by the ordered-quantity total value separating means in the settlement processing system making use of digital assets of FIG. 1.

The ordered-quantity total value separating means 10 is configured to separate the total value of ordered quantity at each price for each of sell and buy, which is calculated by the ordered-quantity total value calculating means 9, into a first total value that is a largest integer multiple of a minimum trading unit on the first order book equal to or smaller than the total value of ordered quantity itself and a second total value as a remaining value (in this embodiment mode, decimal part less than 1) after subtraction of the first total value (See FIG. 11, Step S10).

First Matched-Order Identifying Means

Figure 12:
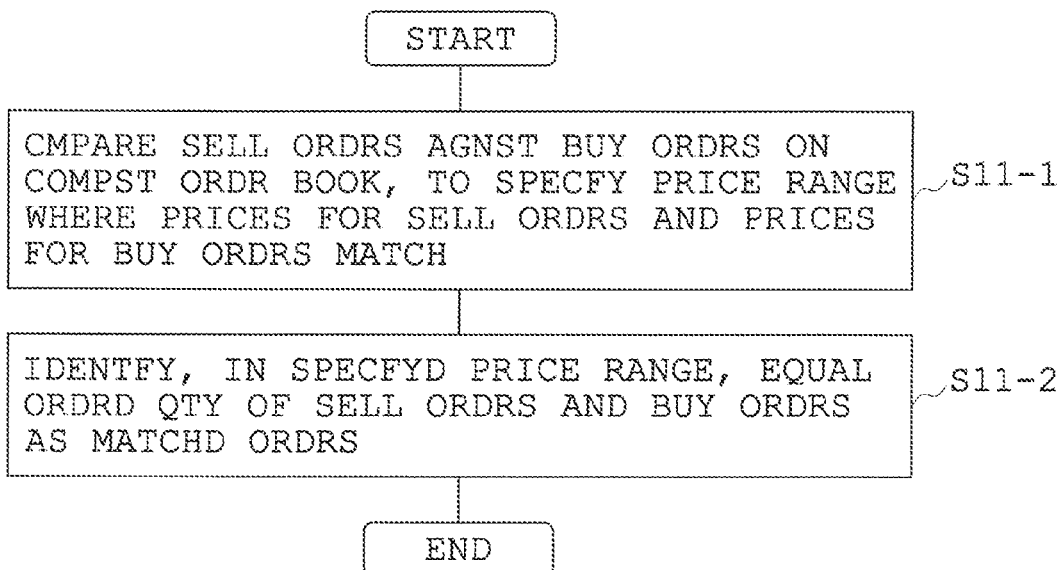
FIG. 12 is a flowchart that shows one example of processing outline by the first matched-order identifying means in the settlement processing system making use of digital assets of FIG. 1.

The first matched-order identifying means 11 is configured to compare sell orders against buy orders on the composite order book, to specify a price range in which prices for sell orders and prices for buy orders match and to identify, in the price range as specified, an equal ordered quantity, which is smaller one of the respective first total values of sell orders and buy orders, of sell orders and buy orders as matched orders (See FIG. 12, Steps S11-1 and S11-2).

First Data Format Reconverting Means

Figure 13:
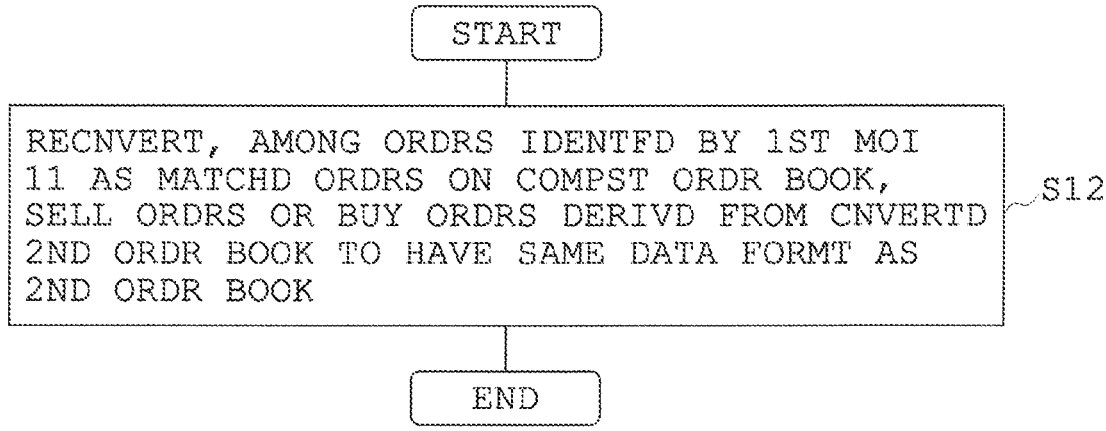
FIG. 13 is a flowchart that shows one example of processing outline by the first data format reconverting means in the settlement processing system making use of digital assets of FIG. 1.

The first data format reconverting means 12 is configured to reconvert, out of the orders identified by the first matched-order identifying means 11 as matched orders on the composite order book, sell orders or buy orders that are derived from the converted second order book to have a same data format as that of the second order book (See FIG. 13, Step S12).

First Transaction Executing Means

The first transaction executing means 13 is configured to make, out of the order information stored in the first order-information storage 2, sell orders or buy orders that are derived from the first order book and identified by the first matched-order identifying means 11 as matched orders on the composite order book executed in order of order price (to be specific, in ascending order of order price for sell orders, and in descending order of order price for buy orders) and in order of earlier to later order time, update the first order-information storage 2 so that order information corresponding to the executed sell orders or buy orders shows "already executed" status, make, out of the order information stored in the second order-information storage 4, sell orders or buy orders that are derived from the converted second order book and identified by the first matched-order identifying means 11 as matched orders on the composite order book and then reconverted by the first data format reconverting means 12 to have the same data format as that of the second order book executed in order of amount of commodity tokens per unit amount of the currency (to be specific, in descending order of amount of commodity tokens per unit amount of the currency for sell orders, and in ascending order of amount of commodity tokens per unit amount of the currency for buy orders) and in order of earlier to later order time, and to update the second order-information storage 4 so that order information corresponding to the executed sell orders or buy orders shows "already executed" status (See FIG. 14, Steps S13-1 to S13-4).

Composite Order Book Updating Means

Figure 15:
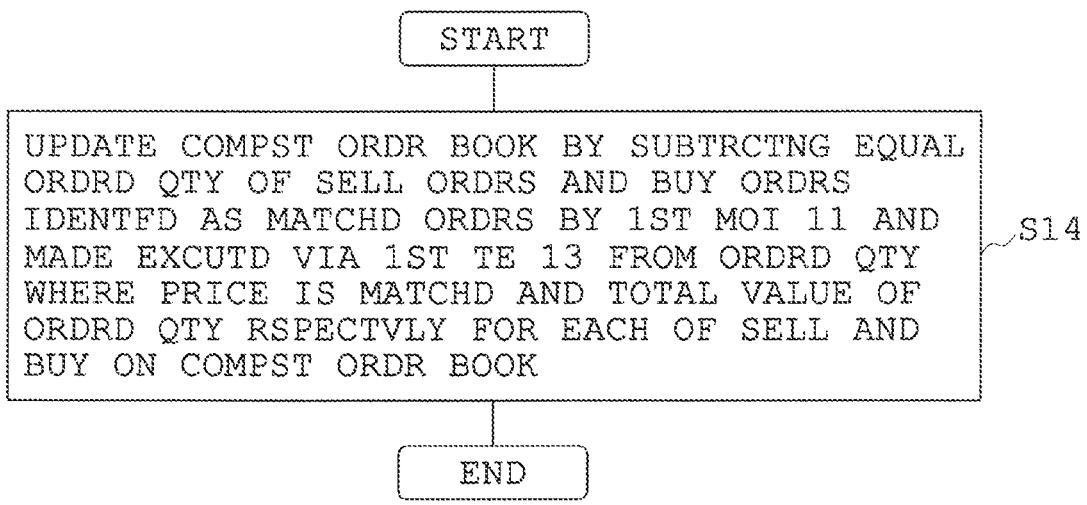
FIG. 15 is a flowchart that shows one example of processing outline by the composite order book updating means in the settlement processing system making use of digital assets of FIG. 1.

The composite order book updating means 14 is configured to update the composite order book by subtracting the equal ordered quantity of sell orders and buy orders identified as matched orders by the first matched-order identifying means 11 and made executed via the first transaction executing means 13 from the ordered quantity where the price is matched and the total value of ordered quantity respectively for each of sell and buy on the composite order book (See FIG. 15, Step S14).

Second Matched-Order Identifying Means

Figure 16:
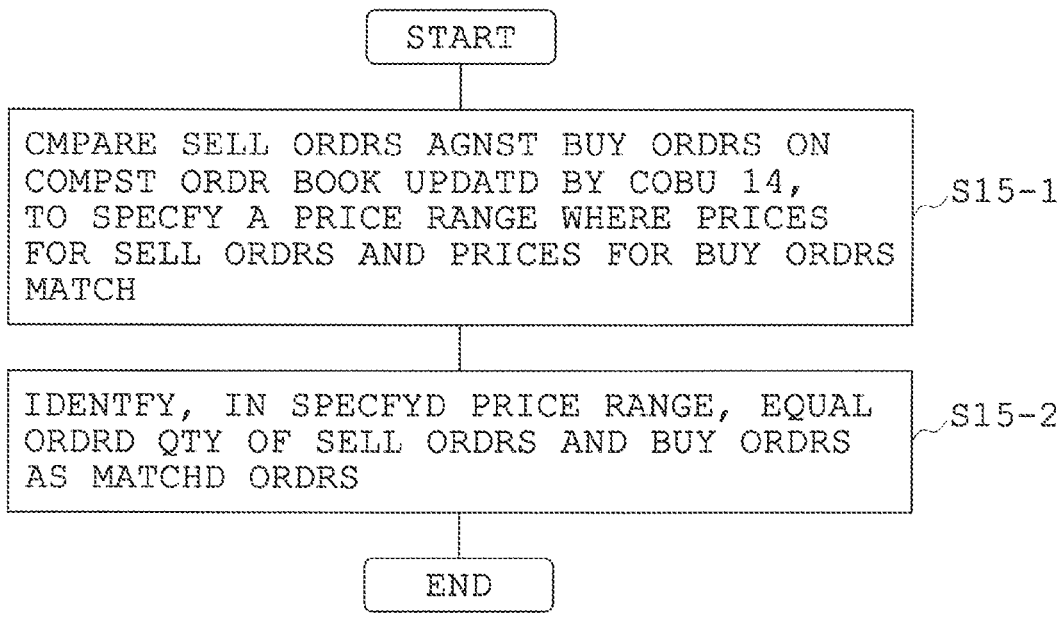
FIG. 16 is a flowchart that shows one example of processing outline by the second matched-order identifying means in the settlement processing system making use of digital assets of FIG. 1.

The second matched-order identifying means 15 is configured to compare sell orders against buy orders on the composite order book updated by the composite order-book updating means 14, to specify a price range in which prices for sell orders and prices for buy orders match and to identify, in the price range as specified, an equal ordered quantity, which is smaller one of the respective second total values of sell orders and buy orders, of sell orders and buy orders as matched orders (See FIG. 16, Steps S15-1, 315-2).

Second Data Format Reconverting Means

Figure 17:
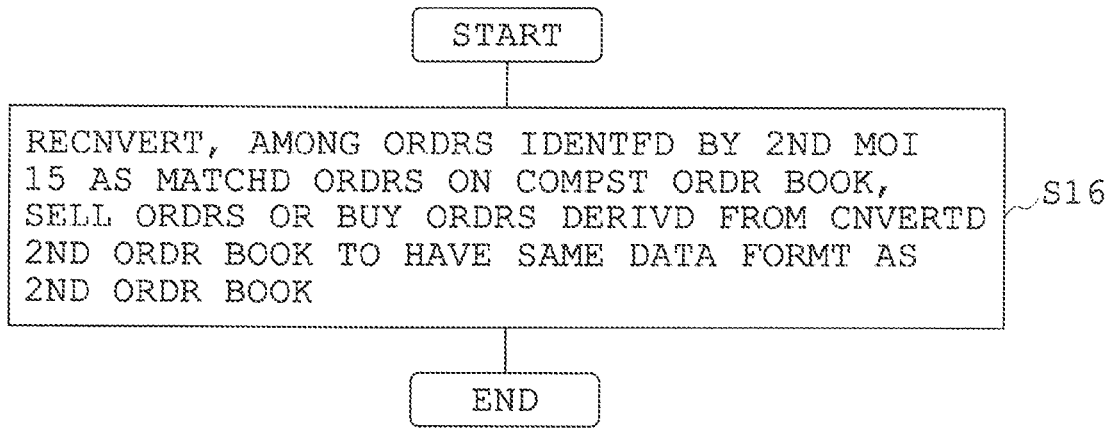
FIG. 17 is a flowchart that shows one example of processing outline by the second data format reconverting means in the settlement processing system making use of digital assets of FIG. 1.

The second data format reconverting means 16 is configured to reconvert, out of the orders identified by the second matched-order identifying means 15 as matched orders on the composite order book, sell orders or buy orders that are derived from the converted second order book to have the same data format as that of the second order book (See FIG. 17, Step S16).

Second Transaction Executing Means

Figure 18:
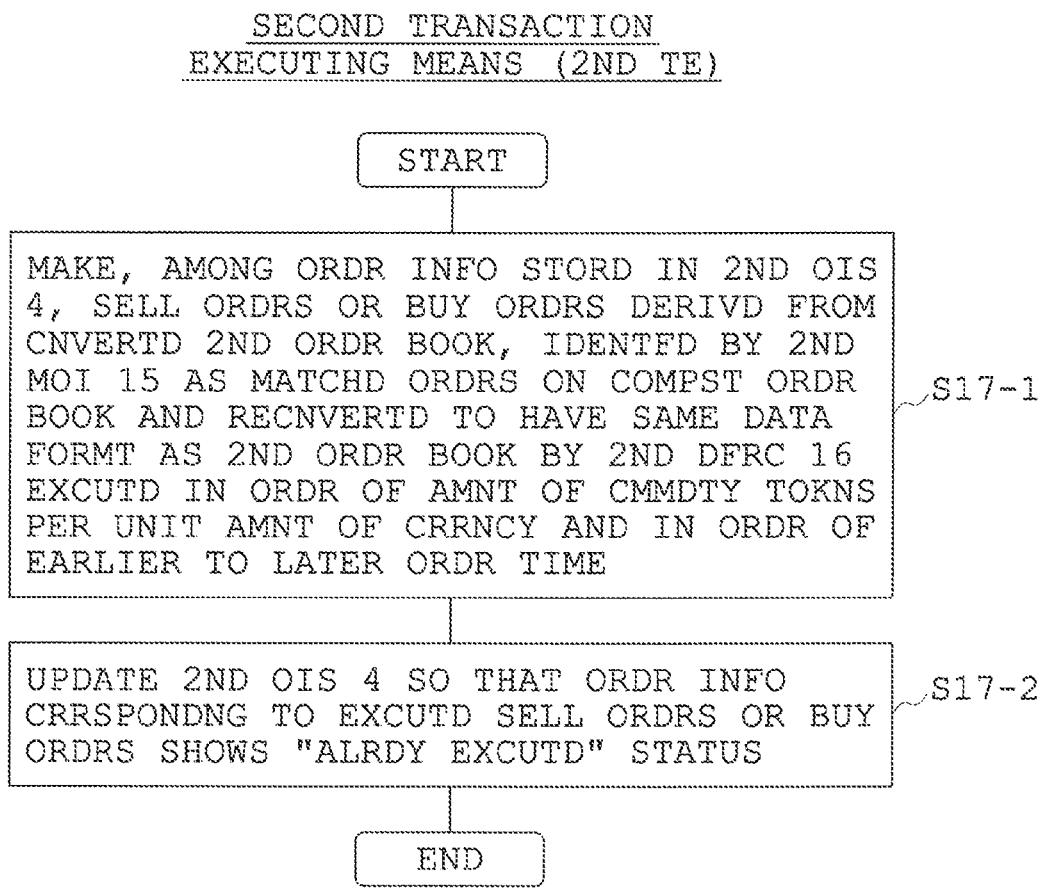
FIG. 18 is a flowchart that shows one example of processing outline by the second transaction executing means in the settlement processing system making use of digital assets of FIG. 1.

The second transaction executing means 17 is configured to make, out of the order information stored in the second order-information storage 4, sell orders or buy orders that are derived from the converted second order book, identified by the second matched-order identifying means 15 as matched orders on the composite order book and then reconverted to have the same data format as that of the second order book by the second data format reconverting means 16 executed in order of amount of commodity tokens per unit amount of the currency (to be specific, in descending order of amount of commodity tokens per unit amount of the currency for sell orders, and in ascending order of amount of commodity tokens per unit amount of the currency for buy orders) and in order of earlier to later order time, and to update the second order-information storage 4 so that order information corresponding to the executed sell orders or buy orders shows "already executed" status (See FIG. 18, Steps S17-1 and S17-2).

Figure 19:
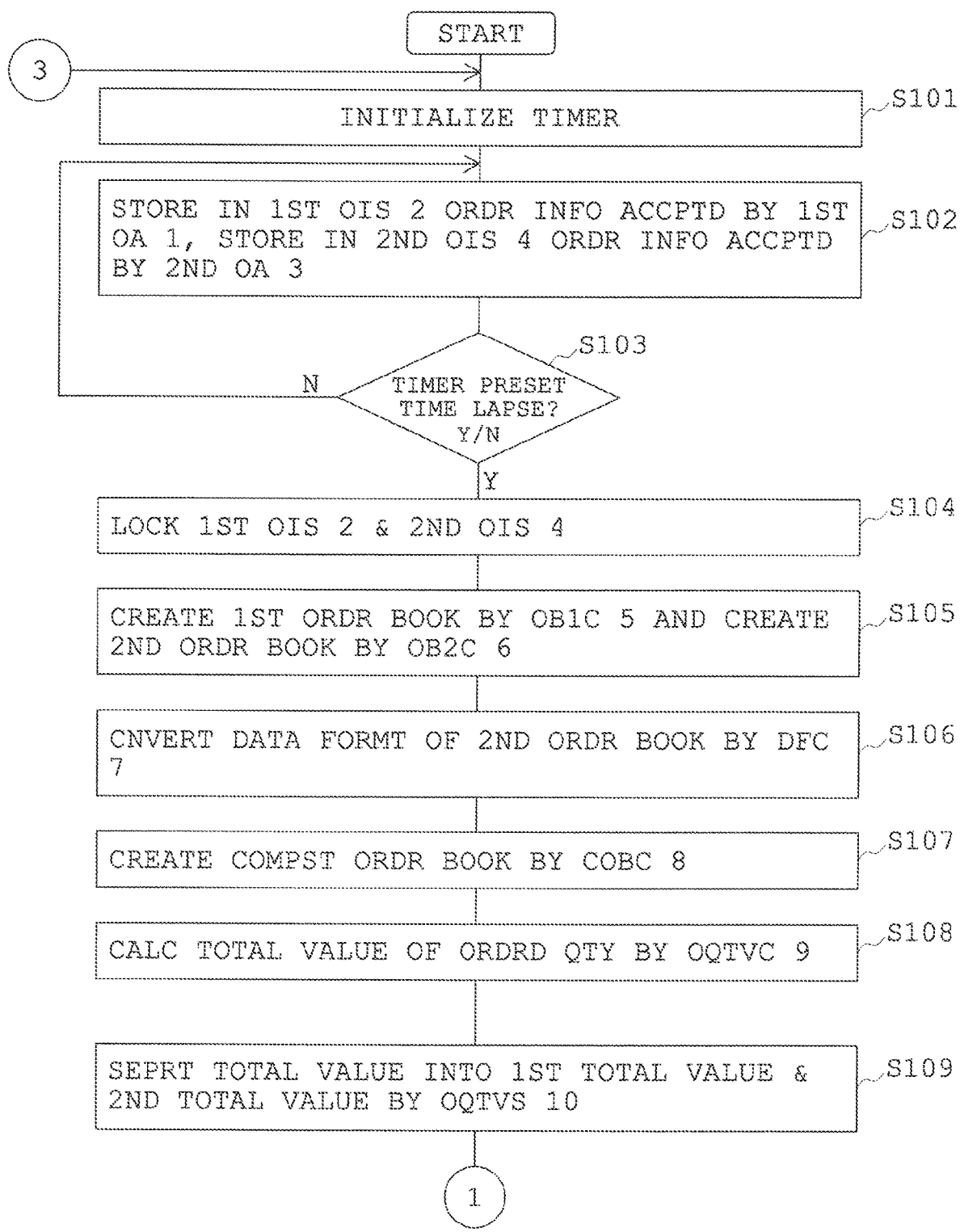
FIG. 19 is a flowchart that shows a part of the flow of the overall processing in the settlement processing system making use of digital assets of FIG. 1.
Figure 20:
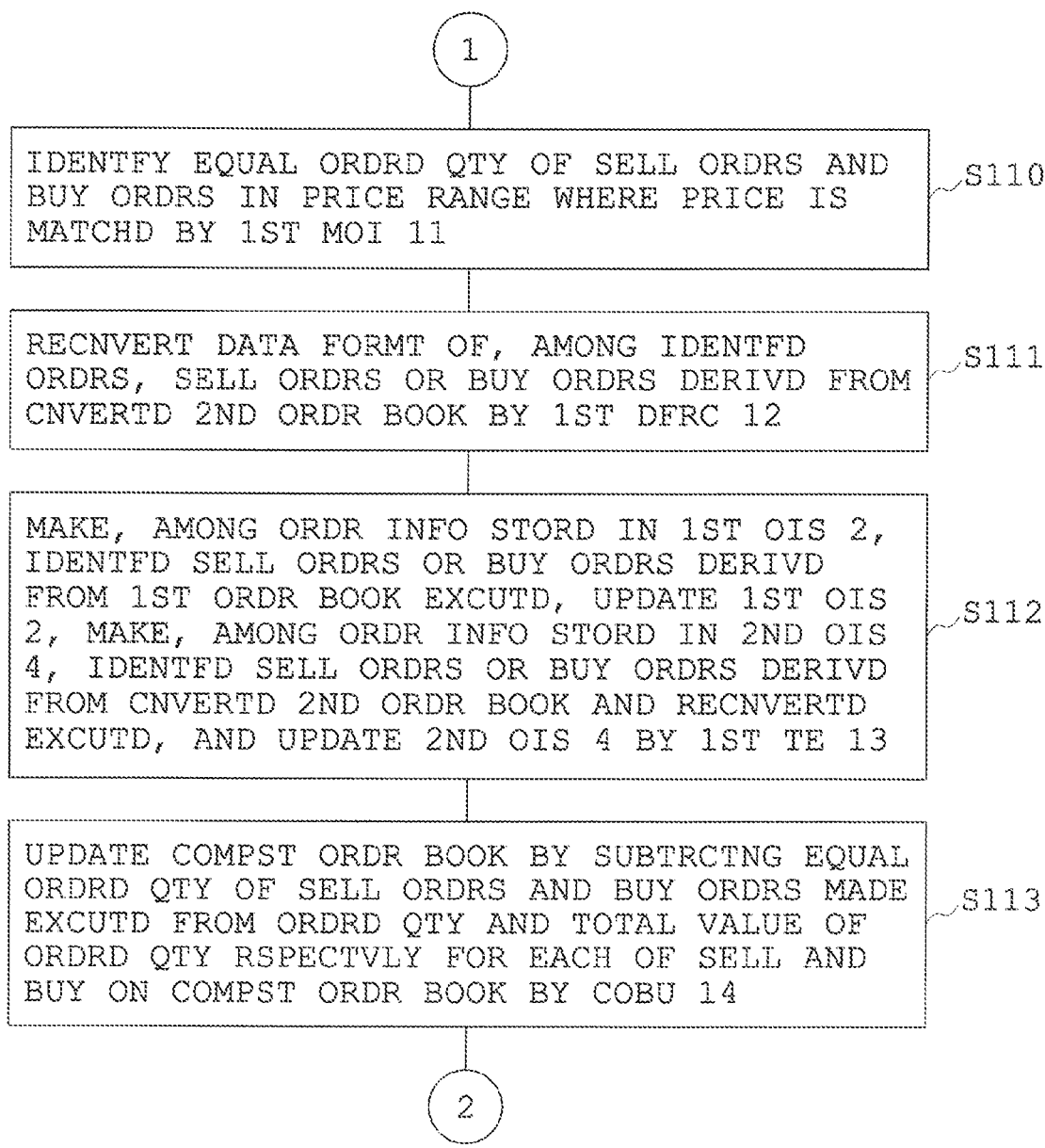
FIG. 20 is a flowchart that shows another part of the flow of the overall processing in the settlement processing system making use of digital assets of FIG. 1.
Figure 21:
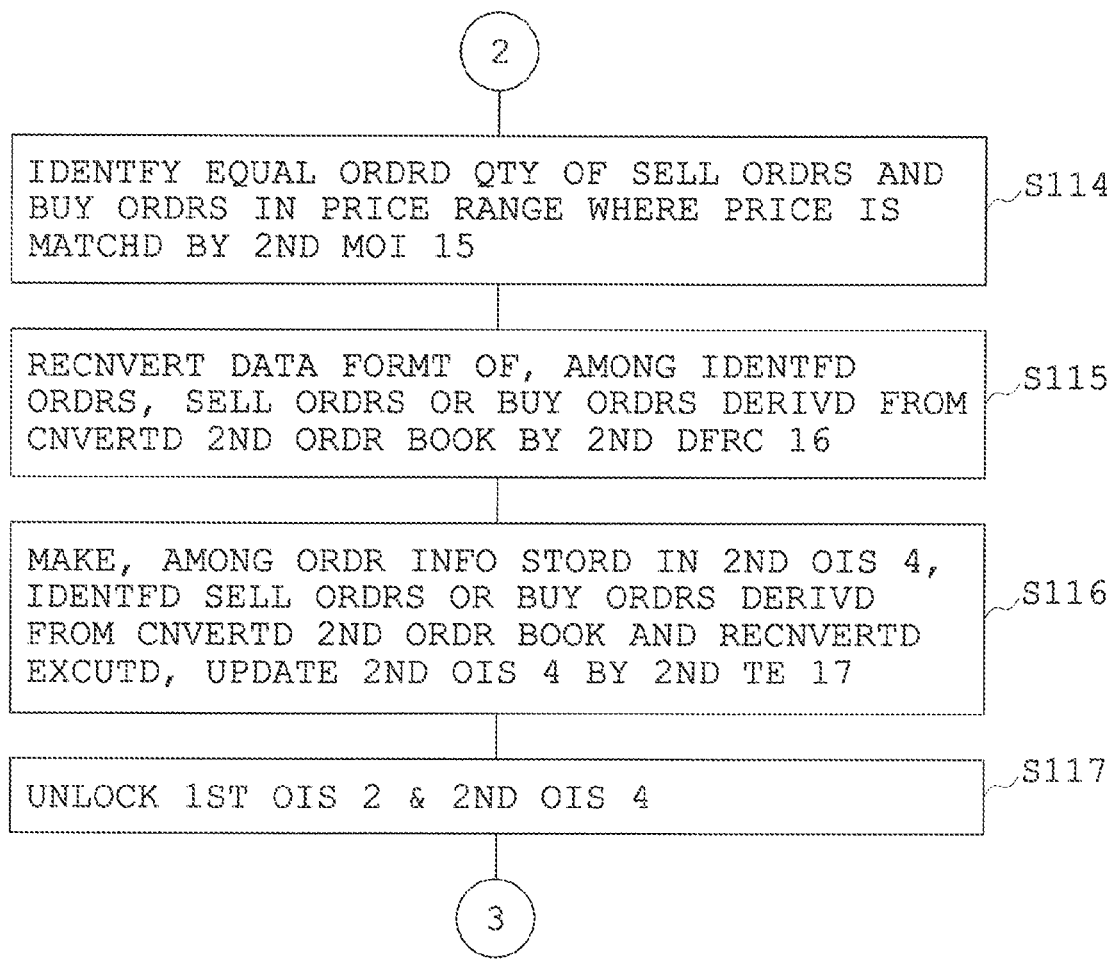
FIG. 21 is a flowchart that shows still another part of the flow of the overall processing in the settlement processing system making use of digital assets of FIG. 1.

The settlement processing system of this embodiment mode locks the first order-information storage 2 and the second order-information storage 4 until processing for storage of order information by the first order-information storage 2 and the second order-information storage 4, transaction execution and update of the first order-information storage 2 and the second order-information storage 4 by the first transaction executing means 13, and transaction execution and update of the second order-information storage 4 by the second transaction executing means 17 is completed, and, after update of the first order-information storage 2 and the second order-information storage 4 by the first transaction executing means 13 and the second transaction executing means 17, releases the lock. Then, after a very short period less than a second passes, processing from storage of order information by the first order-information storage 2 with trading orders newly accepted by the first order-information accepting means 1 being added, storage of order information by the second order-information storage 4 with trading orders newly accepted by the second order-information accepting means 3 being added, transaction execution and update of the first order-information storage 2 and second order-information storage 4 by the first transaction execution means 13, through transaction execution and update of the second order-information storage 4 by the second transaction executing means 17 is repeated (See FIGS. 19 to 21, Steps S101 to S117).

How data is arranged on the order books at each step of processing in the settlement processing system 1 making use of digital assets of the first embodiment mode thus configured will be exemplified with tables.

In this example, it is assumed that the data configuration of the first order book at the point where order information on trading orders for a commodity stored in the first order-information storage 2 is read out by the order book I creating means 5 is in the status shown in Table 1, and that the data configuration of the second order book at the point where the order book II creating means 6 reads out order information on trading orders for commodity tokens stored in the second order-information storage 4 and creates the second order book is in the status shown in Table 2. Also, the commodity as the object of trading appearing in the first order book is gold, and the digital asset as the object of trading appearing on the second order book is gold token.

TABLE 1

First order book (price linked to major exchanges) presented in yen per unit of 1 gram

| sell | price | buy |
|---|---|---|
| 6 | 5005 | |
| 5 | 5004 | |
| 4 | 5003 | |
| 3 | 5002 | |
| 2 | 5001 | |
| 2 | 5000 | |
| | 4999 | 3 |
| | 4998 | 4 |
| | 4997 | 5 |
| | 4996 | 6 |
| | 4995 | 7 |
| gram | yen | gram |

In the example of Table 1, with the ask price being 5000 yen per 1 gram of gold and the bid price being 4999 yen per 1 gram of gold, there are no matched orders.

TABLE 2

Second order book presented in grams per unit of 1 yen

| sell | weight in grams | buy |
|---|---|---|
| | 0.0002005 | 905 |
| | 0.0002004 | 805 |
| | 0.0002003 | 12 |
| | 0.0002002 | 66 |
| | 0.0002001 | 298 |
| 12 | 0.0002000 | 5011 |
| | 0.0001999 | 229 |
| 9 | 0.0001998 | |
| 25 | 0.0001997 | |
| 2059 | 0.0001996 | |
| 95 | 0.0001995 | |
| 128 | 0.0001994 | |
| yen | gram | yen |

In the example of Table 2, with the ask amount being 0.0002000 grams of gold token per 1 yen and the bid amount being 0.0001996 grams of gold token per 1 yen, there exist matched orders at 0.0002000 grams.

In this situation, the data format converting means 7 converts the data format of the second order book shown in FIG. 2 into the same format as that of the first order book (See FIG. 8, Step S7).

To be specific, the data format converting means 7 first reciprocalizes the quantity in grams of the commodity per 1 yen (price in yen per 1 gram of the commodity is given), and divides the ordered quantity by the reciprocal.

The data arrangement of the second order book at that stage is shown in FIG. 3.

TABLE 3

Second order book (reciprocalizing quantity of commodity in grams per 1 yen (price in yen per 1 gram is given), and dividing ordered quantity by the reciprocal)

| sell | price | buy |
|---|---|---|
| | 4987.5311721 | 0.1814525 |
| | 4990.0199601 | 0.1613220 |
| | 4992.5112332 | 0.0024036 |
| | 4995.0049950 | 0.0132132 |
| | 4997.5012494 | 0.0596298 |
| 0.0024000 | 5000.0000000 | 1.0022000 |
| | 5002.5012506 | 0.0457771 |
| 0.0017982 | 5005.0050050 | |
| 0.0049925 | 5007.5112669 | |
| 0.4109764 | 5010.0200401 | |
| 0.0189525 | 5012.5313283 | |
| 0.0255232 | 5015.0451354 | |

The data format converting means 7 then sorts the items in descending order of price, thereby completing creation of the converted second order book. The data arrangement of the converted second order book at this stage is shown in Table 4.

TABLE 4

Converted second order book (sorted in descending order of price as in the first order book) presented in yen per unit of 1 gram

| sell | price | buy |
|---|---|---|
| 0.0255232 | 5015.0451354 | |
| 0.0189525 | 5012.5313283 | |

TABLE 4-continued

Converted second order book (sorted in
descending order of price as in the first order book)
presented in yen per unit of 1 gram

| sell | price | buy |
|---|---|---|
| 0.4109764 | 5010.0200401 | |
| 0.0049925 | 5007.5112669 | | quantity total value calculating means 9, into a first total value that is a largest integer multiple (in this example, an integer equal to or greater than 1) of a minimum trading unit on the first order book equal to or smaller than the total value of ordered quantity itself and a second total value as a remaining value (in this example, decimal part less than 1) after subtraction of the first total value (See FIG. 11, Step S10).

The data arrangement of the composite order book at this stage is shown in Table 5.

TABLE 5

| | | | Composite order book | | | | | |
|---|---|---|---|---|---|---|---|---|
| decimal part | integer part | total | sell | price | buy | total | integer part | decimal part |
| 0.4646428 | 22 | 22.4646428 | 0.0255232 | 5015.0451354 | | | | |
| 0.4391196 | 22 | 22.4391196 | 0.0189525 | 5012.5313283 | | | | |
| 0.4201671 | 22 | 22.4201671 | 0.4109764 | 5010.0200401 | | | | |
| 0.0091907 | 22 | 22.0091907 | 0.0049925 | 5007.5112669 | | | | |
| 0.0041982 | 22 | 22.0041982 | 0.0017982 | 5005.0050050 | | | | |
| 0.0024000 | 22 | 22.0024000 | 6 | 5005 | | | | |
| 0.0024000 | 16 | 16.0024000 | 5 | 5004 | | | | |
| 0.0024000 | 11 | 11.0024000 | 4 | 5003 | | | | |
| 0.0024000 | 7 | 7.0024000 | | 5002.501251 | 0.0457771 | 0.0457771 | | 0.0457771 |
| 0.0024000 | 7 | 7.0024000 | 3 | 5002 | | 0.0457771 | | 0.0457771 |
| 0.0024000 | 4 | 4.0024000 | 2 | 5001 | | 0.0457771 | | 0.0457771 |
| 0.0024000 | 2 | 2.0024000 | 2 | 5000 | | 0.0457771 | | 0.0457771 |
| 0.0024000 | 0 | 0.0024000 | 0.0024000 | 5000.0000000 | 1.0022000 | 1.0479771 | 1 | 0.0479771 |
| | | | | 4999 | 3 | 4.0479771 | 4 | 0.0479771 |
| | | | | 4998 | 4 | 8.0479771 | 8 | 0.0479771 |
| | | | | 4997.5012494 | 0.0596298 | 8.1076069 | 8 | 0.1076069 |
| | | | | 4997 | 5 | 13.1076069 | 13 | 0.1076069 |
| | | | | 4996 | 6 | 19.1076069 | 19 | 0.1076069 |
| | | | | 4995.0049950 | 0.0132132 | 19.1208201 | 19 | 0.1208201 |
| | | | | 4995 | 7 | 26.1208201 | 26 | 0.1208201 |
| | | | | 4992.5112332 | 0.0024036 | 26.1232237 | 26 | 0.1232237 |
| | | | | 4990.0199601 | 0.1613220 | 26.2845457 | 26 | 0.2845457 |
| | | | | 4987.5311721 | 0.1814525 | 26.4659982 | 26 | 0.4659982 |
| | | gram | gram | yen | gram | gram | | |

TABLE 4-continued

Converted second order book (sorted in
descending order of price as in the first order book)
presented in yen per unit of 1 gram

| sell | price | buy |
|---|---|---|
| 0.0017982 | 5005.0050050 | |
| | 5002.5012506 | 0.0457771 |
| 0.0024000 | 5000.0000000 | 1. 0022000 |
| | 4997.5012494 | 0.0596298 |
| | 4995.0049950 | 0.0132132 |
| | 4992.5112332 | 0.0024036 |
| | 4990.0199601 | 0.1613220 |
| | 4987.5311721 | 0.1814525 |
| gram | yen | gram |

Then, the composite order book creating means 8 creates a composite order book by merging the first order book created by the order book I creating means 5 and the converted second order book created by the data format converting means 7 in such a manner that order information is sorted by price (in descending order as in the first order book) (See FIG. 9, Step S8).

Then, the ordered-quantity total value calculating means 9 calculates a total value of ordered quantity up to or down to each price for each of sell and buy on the composite order book (See FIG. 10, Step S9).

Then, the ordered-quantity total value separating means 10 separates the total value of ordered quantity at each price for each of sell and buy, which is calculated by the ordered-quantity total value calculating means 9, into a first total value that is a largest integer multiple (in this example, an integer equal to or greater than 1) of a minimum trading unit on the first order book equal to or smaller than the total value of ordered quantity itself and a second total value as a remaining value (in this example, decimal part less than 1) after subtraction of the first total value (See FIG. 11, Step S10).

Then, the first matched-order identifying means 11 compares sell orders against buy orders on the composite order book, to specify a price range in which prices for sell orders and prices for buy orders match and to identify, in the price range as specified, an equal ordered quantity, which is smaller one of the respective first total values of sell orders and buy orders, of sell orders and buy orders as matched orders (See FIG. 12, Steps S11-1 and S11-2).

In this example, the first matched-order identifying means 11 first specifies a price range from 5000.0000000 yen to 5002.501251 yen as the price range in which prices for sell orders and prices for buy orders match on the composite order book shown in Table 5.

Then, the first matched-order identifying means 11 identifies, in this price range, an equal ordered quantity of sell orders and buy orders, that is, the ordered quantity "1" of sell orders at the price 5000 yen out of the first total value "2" of sell orders and the ordered quantity "1" of buy orders at the price 5000.0000000 yen, which is equal to the first total value "1" of buy orders, as matched orders.

Then, the first data format reconverting means 12 reconverts, out of the orders identified by the first matched-order identifying means 11 as matched orders on the composite order book, sell orders or buy orders that are derived from the converted second order book to have a same data format as that of the second order book (See FIG. 13, Step S12).

In this example, the first data format reconverting means 12 reconverts the data format of the ordered quantity "1" of buy orders at 5000.0000000 yen into the ordered quantity "5000" of buy orders at 0.0002000 grams.

In the reconversion of data format, reciprocalizing an order price of orders on the composite order book derived from the converted second order book gives an amount of commodity tokens of orders on the second order book, and multiplying an ordered quantity of orders on the composite order book derived from the converted second order book by the order price on the composite order book gives an ordered quantity of orders on the second order book.

If a value as a result of reconversion by the first data format reconverting means 12 contains fractions less than "1", or the minimum unit of ordered quantity on the second order book, they may be rounded down. Alternatively, a provider of this system may place an order to be matched with the order having an ordered quantity less than the minimum unit.

Then, the first transaction executing means 13 makes, out of the order information stored in the first order-information storage 2, sell orders or buy orders that are derived from the first order book and identified by the first matched-order identifying means 11 as matched orders on the composite order book executed in order of order price (to be specific, in ascending order of order price for sell orders, and in descending order of order price for buy orders) and in order of earlier to later order time, updates the first order-information storage 2 so that order information corresponding to the executed sell orders or buy orders shows "already executed" status, makes, out of the order information stored in the second order-information storage 4, sell orders or buy orders that are derived from the converted second order book and identified by the first matched-order identifying means 11 as matched orders on the composite order book and then reconverted by the first data format reconverting means 12 to have the same data format as that of the second order book executed in order of amount of commodity tokens per unit amount of the currency (to be specific, in descending order of amount of commodity tokens per unit amount of the currency for sell orders, and in ascending order of amount of commodity tokens per unit amount of the currency for buy orders) and in order of earlier to later order time, and updates the second order-information storage 4 so that order information corresponding to the executed sell orders or buy orders shows "already executed" status (See FIG. 14, Steps S13-1 to S13-4).

In this example, the first transaction executing means 13 makes, out of the order information stored in the first order-information storage 2, the ordered quantity "1" of sell orders at 5000 yen on the composite order book shown in Table 5, which is derived from the first order book, executed in order of earlier to later order time and updates the order information stored in the first order-information storage 2.

Also in this example, the first transaction executing means 13 makes, out of the order information stored in the second order-information storage 4, the ordered quantity "1" of buy orders at 5000.0000000 yen on the composite order book, which is derived from the converted second order book and reconverted by the first data format reconverting means 12 into the ordered quantity "5000" of buy orders at 0.0002000 grams per 1 yen, executed in order of earlier to later order time and updates the order information stored in the second order-information storage 4.

Then, the composite order book updating means 14 updates the composite order book by subtracting the equal ordered quantity of sell orders and buy orders identified as matched orders by the first matched-order identifying means 11 and made executed via the first transaction executing means 13 from the ordered quantity where the price is matched and the total value of ordered quantity respectively for each of sell and buy on the composite order book (See FIG. 15, Step S14).

The data arrangement of the composite order book at this stage is shown in Table 6.

TABLE 6

| decimal part | integer part | total | sell | price | buy | total | integer part | decimal part |
|---|---|---|---|---|---|---|---|---|
| 0.4646428 | 21 | 21.4646428 | 0.0255232 | 5015.0451354 | | | | |
| 0.4391196 | 21 | 21.4391196 | 0.0189525 | 5012.5313283 | | | | |
| 0.4201671 | 21 | 21.4201671 | 0.4109764 | 5010.0200401 | | | | |
| 0.0091907 | 21 | 21.0091907 | 0.0049925 | 5007.5112669 | | | | |
| 0.0041982 | 21 | 21.0041982 | 0.0017982 | 5005.0050050 | | | | |
| 0.0024000 | 21 | 21.0024000 | 6 | 5005 | | | | |
| 0.0024000 | 15 | 15.0024000 | 5 | 5004 | | | | |
| 0.0024000 | 10 | 10.0024000 | 4 | 5003 | | | | |
| 0.0024000 | 6 | 6.0024000 | | 5002.501251 | 0.0457771 | 0.0457771 | | 0.0457771 |
| 0.0024000 | 6 | 6.0024000 | 3 | 5002 | | 0.0457771 | | 0.0457771 |
| 0.0024000 | 3 | 3.0024000 | 2 | 5001 | | 0.0457771 | | 0.0457771 |
| 0.0024000 | 1 | 1.0024000 | 1 | 5000 | | 0.0457771 | | 0.0457771 |
| 0.0024000 | 0 | 0.0024000 | 0.0024000 | 5000.0000000 | 0.0022000 | 0.0479771 | 0 | 0.0479771 |
| | | | | 4999 | 3 | 3.0479771 | 3 | 0.0479771 |
| | | | | 4998 | 4 | 7.0479771 | 7 | 0.0479771 |
| | | | | 4997.5012494 | 0.0596298 | 7.1076069 | 7 | 0.1076069 |
| | | | | 4997 | 5 | 12.1076069 | 12 | 0.1076069 |
| | | | | 4996 | 6 | 18.1076069 | 18 | 0.1076069 |
| | | | | 4995.0049950 | 0.0132132 | 18.1208201 | 18 | 0.1208201 |
| | | | | 4995 | 7 | 25.1208201 | 25 | 0.1208201 |
| | | | | 4992.5112332 | 0.0024036 | 25.1232237 | 25 | 0.1232237 |
| | | | | 4990.0199601 | 0.1613220 | 25.2845457 | 25 | 0.2845457 |
| | | | | 4987.5311721 | 0.1814525 | 25.4659982 | 25 | 0.4659982 |
| | | gram | gram | yen | gram | gram | | |

Then, the second matched-order identifying means 15 compares sell orders against buy orders on the composite order book updated by the composite order-book updating means 14, to specify a price range in which prices for sell orders and prices for buy orders match and to identify, in the price range as specified, an equal ordered quantity, which is smaller one of the respective second total values of sell orders and buy orders, of sell orders and buy orders as matched orders (See FIG. 16, Steps S15-1 and S15-2).

In this example, the second matched-order identifying means 15 first specifies, on the composite order book, the price range from 5000.0000000 yen to 5002.501251 yen as a price range in which prices for sell orders and prices for buy orders match.

Then, the second matched-order identifying means 15 identifies, in this price range, an equal ordered quantity of sell orders and buy orders, that is, the ordered quantity "0.0024000" of sell orders at the price 5000.0000 yen, which is equal to the second total value "0.0024000" of sell orders, and the ordered quantity "0.0024000" of buy orders at the price 5002.501251 yen out of the second total value "0.0457771" of buy orders, as matched orders.

Then, the second data format reconverting means 16 reconverts, out of the orders identified by the second matched-order identifying means 15 as matched orders on the composite order book, sell orders or buy orders that are derived from the converted second order book to have the same data format as that of the second order book (See FIG. 17, Step S16).

In this example, the second data format reconverting means 16 reconverts the data format of the ordered quantity "0.0024000" of sell orders at 5000.0000000 yen into the ordered quantity "12" of sell orders at 0.0002000 grams.

Also, the second data format reconverting means 16 reconverts the data format of the ordered quantity "0.0024000" of buy orders at 5002.501251 yen into the ordered quantity "12" of buy orders at 0.0001999 grams.

In the reconversion of data format, reciprocalizing an order price of orders on the composite order book derived from the converted second order book gives an amount of commodity tokens of orders on the second order book, and multiplying an ordered quantity of orders on the composite order book derived from the converted second order book by the order price on the composite order book gives an ordered quantity of orders on the second order book.

If a value as a result of reconversion by the second data format reconverting means 16 contains fractions less than "1", or the minimum unit of order quantity on the second order book, they may be rounded down. Alternatively, a provider of this system may place an order to be matched with the order having an ordered quantity less than the minimum unit.

Then, the second transaction executing means 17 makes, out of the order information stored in the second order-information storage 4, sell orders or buy orders that are derived from the converted second order book, identified by the second matched-order identifying means 15 as matched orders on the composite order book and then reconverted to have the same data format as that of the second order book by the second data format reconverting means 16 executed in order of amount of commodity tokens per unit amount of the currency (to be specific, in descending order of amount of commodity tokens per unit amount of the currency for sell orders, and in ascending order of amount of commodity tokens per unit amount of the currency for buy orders) and in order of earlier to later order time, and updates the second order-information storage 4 so that order information corresponding to the executed sell orders or buy orders shows "already executed" status (See FIG. 18, Steps S17-1 and S17-2).

In this example, the second transaction executing means 17 makes, out of the order information stored in the second order-information storage 4, the ordered quantity "0.0024000" of sell orders at 5000.0000000 yen on the composite order book shown in Table 6, which is derived from the converted second order book and then reconverted into the ordered quantity "12" at 0.0002000 grams per 1 yen by the second data format reconverting means 16, and the ordered quantity "0.0024000" of buy orders at 5002.501251 yen on the composite order book shown in Table 6, which is derived from the second order book and then reconverted into the ordered quantity "12" at 0.0001999 grams per 1 yen by the second data format reconverting means 16, executed in order of earlier to later order time, and updates the order information stored in the second order-information storage 4.

After that, the settlement processing system of this embodiment mode unlocks the first order-information storage 2 and the second order-information storage 4. Then, after a very short period less than a second passes, processing from storage of order information by the first order-information storage 2 with trading orders newly accepted by the first order-information accepting means 1 being added, storage of order information by the second order-information storage 4 with trading orders newly accepted by the second order-information accepting means 3 being added, transaction execution and update of the first order-information storage 2 and second order-information storage 4 by the first transaction execution means 13, through transaction execution and update of the second order-information storage 4 by the second transaction executing means 17 is repeated (See FIGS. 19 to 21, Steps S101 to S117).

As indicated in the example of Table 1 to Table 6, the order quantity "1" of buy orders at 5000 yen on the first order book is equivalent to the order quantity "5000" of buy orders at 0.0002000 grams on the second order book.

What are conducted on the second order book are ultra-small transactions where the economic value of less than minimum unit quantity of a commodity is presented in terms of amount of commodity tokens per unit amount of a currency. The economic value of such commodity tokens per single ordered quantity is extremely low in comparison with economic value of the commodity as evaluated prices in terms of currency per unit of the commodity on the first order book.

In order to obtain economic value equivalent to the economic value per single ordered quantity on the first order book, an enormously large ordered quantity is needed on the second order book.

Since the price of commodity or commodity token fluctuates in a very short period of time, even if orders with an enormously large ordered quantity for commodity tokens are placed as a bulk at one time on the second order book side trading system, it is difficult to match and execute all of these enormously large ordered quantity for commodity tokens.

If the configuration is made so that an trading system 50 on the first order book side and an trading system 60 on the second order book side are provided independent of each other with an HFT arbitrage system 80 being provided to implement arbitrage function between the trading system 50 on the first order book side and the trading system 60 on the second order book side as in the settlement processing system shown in FIG. 24, the HFT arbitrage system 80 would place an enormously large number of minute sell orders and buy orders at high speed on the second order book in the trading system 60 on the second order book side to be matched with a single order on the first order book in the trading system 50 on the first order book side.

When arbitrage functions between the trading system 50 on the first order book side and the trading system 60 on the second order book side, orders with a minimum unit ordered quantity would be repeatedly placed an enormous number of times.

As a result, the data transaction accompanying order placement in the trading system 60 on the second order book side grows enormous, to increase the load on the system and stagnate the processing.

Furthermore, even if orders are miniaturized, price fluctuation of commodities or commodity tokens in a very short period could not be followed, to cause slippage, or a gap between a price at order placement and a price at actual execution, and thus re-ordering tends to be repeated.

One measure to avoid slippage is to keep locking both of the first order-information storage 52 and the second order-information storage 62 until transaction execution and update of the first order-information storage 52 by the first transaction executing means 53 and transaction execution and update of the second order-information storage 62 by the second transaction executing means 62 are completed. However, the trading system 50 on the first order book side and the trading system 60 on the second order book side are configured to be independent of each other and work independently, it is difficult to determine when to lock both of the first order-information storage 52 and the second order-information storage 62. If simultaneous locking of the first order-information storage 52 and the second order-information storage 62 fails, deadlock would occur in the situation where the system works as being overloaded with a large amount of orders; the processing in progress on one order-book side trading system should be interrupted and wait for completion of the processing for transaction execution and update of the order-information storage on the other order-book side trading system, and the programs constituting the system would stop working in the standby state, to cause a massive failure. Further, locking of the system worsens the response in the trading systems on the both order book sides.

In addition, since trading in the trading system on the second order book side is based on the minimum unit of a currency as stated above, ordered quantity is likely to be enormous. As the number of settlements increases in the trading system on the second order book side, enormously large volume of system transactions occur between the two order books (the first order book and the second order book), to necessitate investing in building of a system having a scale sufficient to deal with such enormously large volume of transactions, which results in enormous amount of cost.

In particular, on both of the second order book (in this embodiment mode, the order book on which value is presented in grams per unit of 1 yen) and the first order book (in this embodiment mode, the order book on which value is presented in yen per unit of 1 gram) fluctuation in settlement and price change at the market constantly occur, and thus brands having higher liquidity more easily cause an enormous number of minimum unit data transactions (arbitrage by HFT (the operation of HFT arbitrage system 80 shown in FIG. 24) other than arbitrage between individual order books at external major exchanges and the first order book).

In contrast, according to the settlement processing system making use of digital assets of the first embodiment mode, the configuration is made so that: a data format converting means 7 creates a converted second order book by converting a data format of the second order book into a same format as that of the first order book; a composite order book creating means 8 creates a composite order book by merging the first order book and the converted second order book; an ordered-quantity total value calculating means 9 calculates a total value of ordered quantity up to or down to each price for each of sell and buy on the composite order book; an ordered-quantity total value separating means 10 separates the total value of ordered quantity at each price for each of sell and buy into a first total value that is a largest integer multiple of a minimum trading unit on the first order book equal to or smaller than the total value of ordered quantity itself and a second total value as a remaining value after subtraction of the first total value; a first matched-order identifying means 11 compares sell orders against buy orders on the composite order book, to specify a price range in which prices for sell orders and prices for buy orders match and to identify, in the price range as specified, an equal ordered quantity, which is smaller one of the respective first total values of sell orders and buy orders, of sell orders and buy orders as matched orders; a first data format reconverting means 12 reconverts, out of the orders identified by the first matched-order identifying means 11 as matched orders on the composite order book, sell orders or buy orders that are derived from the converted second order book to have a same data format as that of the second order book; a first transaction executing means 13 makes, out of the order information stored in a first order-information storage 2, sell orders or buy orders that are derived from the first order book and identified by the first matched-order identifying means 11 as matched orders on the composite order book executed in order of order price and in order of earlier to later order time, updates the first order-information storage 2 so that order information corresponding to the executed sell orders or buy orders shows "already executed" status, makes, out of the order information stored in the second order-information storage 4, sell orders or buy orders that are derived from the converted second order book and identified by the first matched-order identifying means 11 as matched orders on the composite order book and then reconverted by the first data format reconverting means 12 to have the same data format as that of the second order book executed in order of amount of commodity tokens per unit amount of the currency and in order of earlier to later order time, and updates the second order-information storage 4 so that order information corresponding to the executed sell orders or buy orders shows "already executed" status; a composite order book updating means 14 updates the composite order book by subtracting the equal ordered quantity of sell orders and buy orders identified as matched orders by the first matched-order identifying means 11 and made executed via the first transaction executing means 13 from the ordered quantity where the price is matched and the total value of ordered quantity respectively for each of sell and buy on the composite order book; a second matched-order identifying means 15 compares sell orders against buy orders on the composite order book updated by the composite order-book updating means 14, to specify a price range in which prices for sell orders and prices for buy orders match and to identify, in the price range as specified, an equal ordered quantity, which is smaller one of the respective second total values of sell orders and buy orders, of sell orders and buy orders as matched orders; a second data format reconverting means 16 reconverts, out of the orders identified by the second matched-order identifying means 15 as matched orders on the composite order book, sell orders or buy orders that are derived from the converted second order book to have the same data format as that of the second order book; and a second transaction executing means 17 makes, out of the order information stored in the second order-information storage 4, sell orders or buy orders that are derived from the converted second order book, identified by the second matched-order identifying means 15 as matched orders on the composite order book and then reconverted to have the same data format as that of the second order book by the second data format reconverting means 16 executed in order of amount of commodity tokens per unit amount of the currency and in order of earlier to later order time. Therefore, an enormous number of orders on the system 60 on the second order book side, which are needed to be matched with one order on the system 50 on the first order book side in the settlement processing system making use of digital assets shown in FIG. 24, could be executed through the matching process on one composite order book; the enormously load-bearing function to assure price linkage between the first order book and the second order book provided by HFT arbitrage system 80 shown in FIG. 24 can be dispensed with.

Therefore, according to this embodiment mode, it is possible to obtain a settlement processing system which, making use of digital assets, makes it possible to conduct transactions, in the same manner as conventionally done at the major commodity exchanges in the world, with use of a first order book on which economic value of a commodity is presented as prices evaluated in terms of currency per unit amount of the commodity, and to conduct ultra-small transactions of the commodity as digital assets, which have not been conducted at the major commodity exchanges in the world, with use of a second order book on which economic value of less than minimum unit quantity of the commodity is presented in terms of amount of commodity tokens per unit amount of a currency, and makes it possible to conduct smooth transactions upon assuring price linkage between the first order book and the second order book and trading liquidity between the order books while preventing the load on the system domain from growing enormously because of involvement of arbitrage function by HFT.

In the settlement processing system making use of digital assets of this embodiment mode, "gram" (g) is used as the unit of commodity's quantity and the currency "yen" (Y) is used as a measure of price, for convenience. Not limited to them, however, those used at exchanges in the world such as "ounce" (oz) and "dollar" ($) are applicable.

In the settlement processing system making use of digital assets of this embodiment mode, the price contained in the order information forming the first order book is presented as not including the transaction fee or the spread, for convenience. It may include, however, the transaction fee or the spread. For example, the price on the first order book may be orderer's limit price plus (in the case of buy order) or minus (in the case of sell order) an amount equivalent to the spread.

In the settlement processing system making use of digital assets of this embodiment mode, the minimum trading unit on the first order book is set to "1" for convenience. However, a minimum trading unit setting means (not shown) may be provided to set a unit for ultra-large transactions such as "100" or "1000".

The first order-accepting means 1 and the second order-accepting means 3 may be configured to display on a screen only sell orders and buy orders with the best quote.

Second Embodiment Mode

Figure 22:
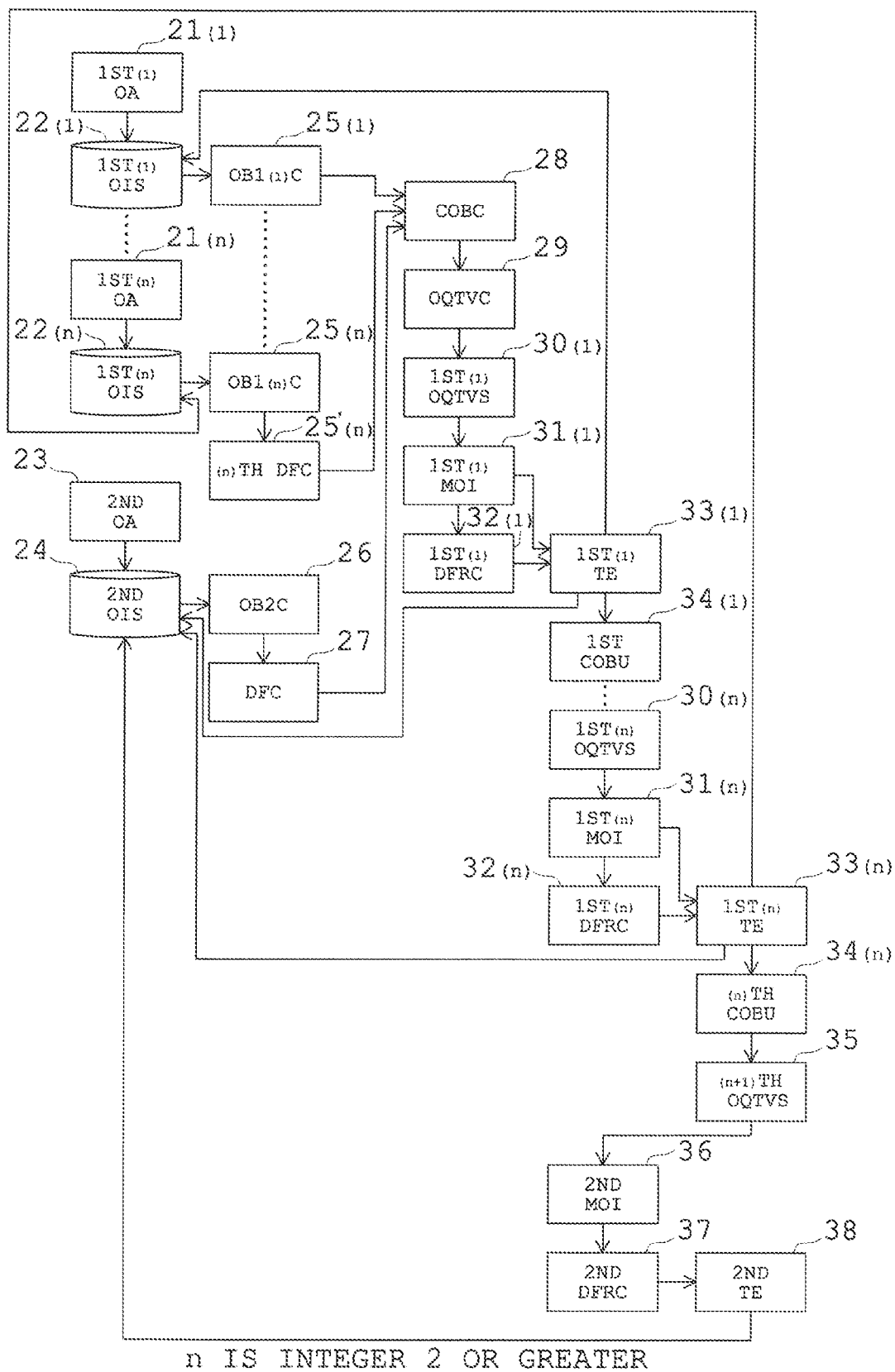
FIG. 22 is an explanatory diagram that schematically shows the overall configuration of the settlement processing system making use of digital assets according to the second embodiment mode of the present invention.

FIG. 22 is an explanatory diagram that schematically shows the overall configuration of the settlement processing system making use of digital assets according to the second embodiment mode of the present invention.

The settlement processing system making use of digital assets of this embodiment mode is one example configured to allow a plurality of units of commodity's quantity and currencies as a measure of price used at exchanges in the world, such as "gram" (g), "yen" (Y), "ounce" (oz) and "dollar" ($), to be applied.

The settlement processing system making use of digital assets of the second embodiment mode has a first (1) order-accepting means [1ST(1) OA] 21(1) to a first (n) order-accepting means [1ST(n) OA] 21(n), a first (1) order-information storage [1ST(1) OIS] 22(1) to a first (n) order-information storage [1ST(n) OIS] 22(n), a second order-accepting means [2ND OA] 23, a second order-information storage [2ND OIS] 24, an order book I(1) creating means [OB1(1)C] 25(1) to an order book I(n) creating means [OB1(n)C]25(n), an (n)th data format converting means [(n)TH DFC]25' (n), an order book II creating means [OB2C] 26, a data format converting means [DFC] 27, a composite order book creating means [COBC] 28, an ordered-quantity total value calculating means [OQTVC] 29, a first ordered-quantity total value separating means [1ST OQTVS] 30(1) to an (n)th ordered-quantity total value separating means [(n)TH OQTVS] 30(n), a first (1) matched-order identifying means [1ST(1) MOI] 31(1) to a first (n) matched-order identifying means [1ST(n) MOI] 31(n), a first (1) data format reconverting means [1ST(1) DFRC] 32(1) to a first (n) data format reconverting means [1ST(n) DFRC]32(n), a first (1) transaction executing means [1ST(1) TE]33(1) to a first (n) transaction executing means [1ST(n) TE]33(n), a first composite order book updating means [1ST COBU]34(1) to an nth composite order book updating means [(n)TH COBU] 34(n), an (n+1)th ordered quantity total value separating means [(n+1)TH OQTVS] 35, a second matched-order identifying means [2ND MOI] 36, a second data format reconverting means [2ND DFRC] 37, and a second transaction executing means [2ND TE] 38 (n is an integer 2 or greater).

The first (1) order-accepting means 21(1), the first (1) order-information storage 22(1), the order book I(1) creating means 25(1), the second order-accepting means 23, the second order-information storage 24, the order book II creating means 26, the data format converting means 27, the ordered-quantity total value calculating means 29, the first (1) ordered-quantity total value separating means 30(1), the first (1) matched-order identifying means 31(1), the first (1) data format reconverting means 32(1), the first (1) transaction executing means 33(1), the first (1) composite order book updating means 34(1), the second matched-order identifying means 36, the second data format reconverting means 37, and the second transaction executing means 38 in the settlement processing system making use of digital assets of this embodiment mode are substantially the same as the first order-accepting means 1, the first order-information storage 2, the order book I creating means 5, the second order-accepting means 3, the second order-information storage 4, the order book II creating means 6, the data format converting means 7, the ordered-quantity total value calculating means 9, the ordered-quantity total value separating means 10, the first matched-order identifying means 11, the first data format reconverting means 12, the first transaction executing means 13, the composite order book updating means 14, the second matched-order identifying means 15, the second data format reconverting means 16, and the second transaction executing means 17 in the settlement processing system making use of digital assets of the first embodiment mode shown in FIG. 1, respectively.

First(n) Order-Accepting Means

The first (n) order-accepting means 21(n) is configured to display on a screen quote prices of such commodity as that traded at major commodity exchanges per minimum unit quantity of the commodity upon use of a unit quantity and a currency as a measure of the price that are different from those used in the first (n-1) order-accepting means $21(n\text{-}1)$, and to accept trading orders for the commodity for certain prices per minimum unit quantity of the commodity.

First(n) Order-Information Storage

The first (n) order-information storage $22(n)$ includes a database system provided with database files, and is configured to store order information on the trading orders for the commodity accepted by the first (n) order-accepting means $21(n)$ upon sorting the orders by price and order time for each of sell orders and buy orders.

Order Book I(n) Creating Means

The order book I(n) creating means $25(n)$ is configured to read out the order information on trading orders for the commodity stored in the first (n) order-information storage $22(n)$, to count ordered quantity at each price, and to create a first (n) order book on which the ordered quantities as counted are listed in order of price.

(n)Th Data Format Converting Means

The (n)th data format converting means 25' is configured to convert the data format of the first (n) order book created by the order book I(n) creating means $25(n)$ into the same format as that of the first (1) order book, to create the converted first (n) order book.

For example, if the first (1) order book applies 1 g as the unit quantity of the commodity and yen as a currency to measure the price and the first (n) order book applies 1 oz as a unit quantity of the commodity and dollar as a currency to measure the price, conversion from a price of the commodity in dollars per 1 oz on the first (n) order book to a price of the commodity in yen per 1 g is carried out by multiplying the price of the commodity by the market price of yen per 1$ and dividing the product by 31.1034768. Also, conversion from an ordered quantity at that price of the commodity in dollars per 1 oz on the first (n) order book to an ordered quantity at that price in yen per 1 g on the first (1) order book is carried out by multiplying the ordered quantity on the first (n) order book by 31.1034768 and dividing the product by the market price of yen per 1$.

It may be configured so that numerical figures after the decimal point in the reciprocal is rounded up or down to a certain decimal place.

Composite Order Book Creating Means

The composite order book creating means 28 is configured to create a composite order book by merging the first (1) order book created by the order book I(1) creating means 25(1), the converted first (n) order book created by the (n)th data format converting means 25' (n) and the converted second order book created by the data format converting means 27 in such a manner that order information is sorted by price (descending order as in the first (1) order book).

(n)Th Ordered-Quantity Total Value Separating Means

The (n)th ordered-quantity total value separating means $30(n)$ is configured to separate the total value of ordered quantity at each price for each of sell and buy, which is calculated by the ordered-quantity total value calculating means 29, into a first (n) total value that is a largest integer multiple of a minimum trading unit on the first (n) order book equal to or smaller than the total value of ordered quantity itself and a second(n) total value as a remaining value after subtraction of the first (n) total value.

First(n) Matched-Order Identifying Means

The first (n) matched-order identifying means $31(n)$ is configured to compare sell orders against buy orders on the composite order book, to specify a price range in which prices for sell orders and prices for buy orders match and to identify, in the price range as specified, an equal ordered quantity, which is smaller one of the respective first (n) total values of sell orders and buy orders, of sell orders and buy orders as matched orders.

First(n) Data Format Reconverting Means

The first data format reconverting means $32(n)$ is configured to reconvert, out of the orders identified by the first (n) matched-order identifying means $31(n)$ as matched orders on the composite order book, sell orders or buy orders that are derived from the converted first (n) order book to have a same data format as that of the first (n) order book and sell orders or buy orders that are derived from the converted second order book to have a same data format as that of the second order book.

First(n) Transaction Executing Means

The first (n) transaction executing means $33(n)$ is configured to make, out of the order information stored in the first (n) order-information storage $22(n)$, sell orders or buy orders that are derived from the converted first (n) order book and identified by the first (n) matched-order identifying means $31(n)$ as matched orders on the composite order book and then reconverted by the first (n) data format reconverting means $32(n)$ to have the same data format as that of the first (n) order book executed in order of order price (to be specific, in ascending order of order price for sell orders, and in descending order of order price for buy orders) and in order of earlier to later order time, update the first (n) order-information storage $22(n)$ so that order information corresponding to the executed sell orders or buy orders shows "already executed" status, make, out of the order information stored in the second order-information storage 4, sell orders or buy orders that are derived from the converted second order book and identified by the first (1) matched-order identifying means $31(n)$ as matched orders on the composite order book and then reconverted by the first (1) data format reconverting means $32(n)$ to have the same data format as that of the second order book executed in order of amount of commodity tokens per unit amount of the currency (to be specific, in descending order of amount of commodity tokens per unit amount of the currency for sell orders, and in ascending order of amount of commodity tokens per unit amount of the currency for buy orders) and in order of earlier to later order time, and to update the second order-information storage 4 so that order information corresponding to the executed sell orders or buy orders shows "already executed" status.

(n)Th Composite Order Book Updating Means

The (n)th composite order book updating means $34(n)$ is configured to update the composite order book by subtracting the equal ordered quantity of sell orders and buy orders identified as matched orders by the first (n) matched-order identifying means $31(n)$ and made executed via the first (n) transaction executing means $33(n)$ from the ordered quantity where the price is matched and the total value of ordered quantity respectively for each of sell and buy on the composite order book.

(n+1)Th Ordered-Quantity Total Value Separating Means

The (n+1)th ordered-quantity total value separating means 35 is configured to separate the total value of ordered quantity at each price for each of sell and buy on the composite order book updated by (n)th composite order book updating means $34(n)$ into a first total value (first (1) total value) that is a largest integer multiple of a minimum trading unit on the first (1) order book equal to or smaller than the total value of ordered quantity itself and a second total value (second(1) total value) as a remaining value after subtraction of the first (1) total value.

In major exchanges in the world, the price is presented in terms of currencies issued by respective countries. The unit quantity of a commodity also varies with countries.

According to the settlement processing system making use of digital assets of the second embodiment mode, currencies as a measure of price and units of commodity's quantity, which vary with countries, can be unified and thus reasonableness of the price can be more easily assured. In addition, since a large volume of transactions using currencies and units of commodity's quantity at a plurality of exchanges is processed on a single composite order book, the settlement processing system of the second embodiment mode further facilitates smooth transactions upon assuring price linkage between the first order book and the second order book and trading liquidity between the order books while preventing the load on the system domain from growing enormously because of involvement of arbitrage function by HFT.

The remaining configurations and functions are substantially the same as the settlement processing system making use of digital assets of the first embodiment mode.

While the preferred embodiment modes of the present invention are described in detail above, the present invention is not limited to these embodiment modes, which can be modified and replaced in various ways as long as not deviating from the scope of the present invention.

In addition, while the settlement system of the present invention is configured so that the first order book is created on the basis of ordered quantity of trading orders for a commodity at certain prices per minimum unit quantity of the commodity and that the second order book is created on the basis of ordered quantity of trading orders for commodity tokens at certain amounts of commodity tokens per minimum unit amount of a currency, which are less than a minimum unit quantity of the commodity, a settlement system may be configured so that the second order book is created on the basis of ordered quantity of trading orders for a commodity at certain prices per minimum unit quantity of the commodity and that the first order book is created on the basis of ordered quantity of trading orders for commodity tokens at certain amounts of commodity tokens per minimum unit amount of a currency, which are less than a minimum unit quantity of the commodity.

INDUSTRIAL APPLICABILITY

The settlement processing system, the settlement processing method, the settlement processing program, and the computer-readable recording medium on which the settlement processing program is recorded, each of which makes use of digital assets, according to the present invention are useful in the fields relating to trading of digital assets having digitally expressed economic value such as precious metals, non-ferrous metals, energy resources such as oil, gas and electric power, storable crops such as rice and sugar, artworks, and those widely traded such as drinking water.

DESCRIPTION OF REFERENCE SYMBOLS 1 first order-accepting means
2 first order-information storage
3, 23 second order-accepting means
4, 24 second order-information storage
5 order book I creating means
6, 26 order book II creating means
7, 27 data format converting means
8, 28 composite order book creating means
9, 29 ordered-quantity total value calculating means
ordered-quantity total value separating means
11 first matched-order identifying means
12 first data format reconverting means
13 first transaction executing means
14 composite order book updating means
15, 36 second matched-order identifying means
16, 37 second data format reconverting means
17, 38 second transaction executing means
21(1) first (1) order-accepting means
21(n) first (n) order-accepting means
22(1) first (1) order-information storage
22(n) first (n) order-information storage
25(1) order book I(1) creating means
25(n) order book II(n) creating means
25' (n) (n)th data format converting means
30(1) first (1) ordered-quantity total value separating means
30(n) first (n) ordered-quantity total value separating means
31(1) first (1) matched-order identifying means
31(n) first (n) matched-order identifying means
32(1) first (1) data format reconverting means
32(n) first (n) data format reconverting means
33(1) first (1) transaction executing means
33(n) first (n) transaction executing means
34(1) (1)st composite order book updating means
34(n) (n)th composite order book updating means
35 (n+1)th ordered-quantity total value separating means
50 trading system on the first order book side
51 first order-accepting means
52 first order-information storage
53 order book I creating means
54 first matched-order identifying means
55 first transaction executing means
60 trading system on the second order book side
61 second order-accepting means
62 second order-information storage
63 order book II creating means
64 second matched-order identifying means
65 second transaction executing means
80 HFT arbitrage system

The invention claimed is:
1. A settlement processing system, comprising:
a computer configured to:
control a screen to display quote prices of a commodity as that traded at major commodity exchanges per minimum unit quantity of the commodity;
accept trading orders for the commodity at certain prices per minimum unit quantity of the commodity;
control a first order-information storage to store first order information on the accepted trading orders for the commodity;
control the screen to display quote amounts of commodity tokens per unit amount of a currency, wherein the quote amounts are less than a minimum unit quantity of the commodity;
accept trading orders for the commodity tokens at certain amounts of the commodity tokens per unit amount of the currency;
control a second order-information storage to store second order information on the accepted trading orders for the commodity tokens;
read out the stored first order information on the accepted trading orders for the commodity;

count, based on the read out of the first order information, a first ordered quantity at each price value of a plurality of price values;
create a first order book on which the counted first ordered quantity at the each price value is listed in order of the price value;
read out the stored second order information on the accepted trading orders for the commodity tokens;
count, based on the read out of the second order information, a second ordered quantity at each amount of the commodity tokens;
create a second order book on which the counted second ordered quantity for the each amount is listed in order of the amount of the commodity tokens;
convert a data format of the second order book into a same format as that of the first order book to create a converted second order book;
merge the first order book and the converted second order book to create a composite order book, wherein the first order book is merged with the converted second order book such that the first order information and the second order information are sorted by the price value;
calculate a total value of the first ordered quantity and the second ordered quantity up to or down to the each price value for each of sell orders and buy orders on the composite order book;
divide the calculated total value into a first total value that is a largest integer multiple of a minimum trading unit on the first order book and a second total value as a remaining value after subtraction of the first total value from the calculated total value;
compare the sell orders with the buy orders on the composite order book;
specify, based on the comparison, a first price range in which prices for the sell orders and prices for the buy orders match;
identify, in the specified first price range, an equal ordered quantity that is smaller one of the first total value of sell orders and the first total value of buy orders, of the sell orders and the buy orders as matched orders;
reconvert, out of the matched orders on the composite order book, sell orders or buy orders from the converted second order book to have a same data format as that of the second order book;
execute, out of the stored first order information, the sell orders or the buy orders that are derived from the first order book and identified as the matched orders on the composite order book, in order of order price and in order of earlier to later order time;
update the first order-information storage so that order information corresponding to the executed sell orders or the buy orders indicates an "already executed" status;
execute, out of the stored second order information, the reconverted sell orders or the reconverted buy orders in order of the amount of the commodity tokens per unit amount of the currency and in order of earlier to later order time;
update the second order-information storage so that order information corresponding to the executed sell orders or the buy orders, associated with the second order book, indicates the "already executed" status;
update the composite order book by
subtraction of the equal ordered quantity, of the executed sell orders or the buy orders from the first ordered quantity or the second ordered quantity and the calculated total value;
compare the sell orders against the buy orders on the updated composite order book, to specify a second price range in which prices for the sell orders and prices for the buy orders in the updated composite order book match;
identify, in the specified second price range, an equal ordered quantity, that is matched to one of the second total value of sell orders or the second total value of buy orders, of the sell orders and the buy orders as the matched orders;
reconvert, out of the matched orders in the specified second price range on the composite order book, sell orders or buy orders from the converted second order book to have the same data format as that of the second order book;
execute, out of the stored second order information, the reconverted sell orders or the buy orders in the specified second price range in order of the amount of the commodity tokens per unit amount of the currency and in order of earlier to later order time; and
update the second order-information storage so that order information corresponding to the executed sell orders or the buy orders, in the specified second price range, indicates the "already executed" status,
the settlement processing system comprising:
a function as a computer system load expansion prevention means for preventing a load on the settlement processing system from growing enormously because of involvement of an arbitrage function by High Frequency Transactions (HFT) caused by repeated placing of a huge number of orders with minute unit quantities on a second order book side, when arbitrage trading is involved between the first order book and the second order book, by:
converting the data format of the second order book into the same format as that of the first order book to create the converted second order book;
merging the first order book and the converted second order book to create the composite order book;
calculating the total value of the first ordered quantity and the second ordered quantity up to or down to the each price value for each of the sell orders and the buy orders on the composite order book;
dividing the calculated total value into the first total value that is the largest integer multiple of the minimum trading unit on the first order book and the second total value as the remaining value after the subtraction of the first total value from the calculated total value;
comparing the sell orders with the buy orders on the composite order book;
specifying, based on the comparison, the first price range in which the prices for the sell orders and the prices for the buy orders match;
identifying, in the specified first price range, the equal ordered quantity that is smaller one of the first total value of sell orders and the first total value of buy orders, of the sell orders and the buy orders as the matched orders;
reconverting, out of the matched orders on the composite order book, the sell orders or the buy orders from the converted second order book to have the same data format as that of the second order book;

executing, out of the stored second order information, the reconverted sell orders or the buy orders in the specified second price range in order of the amount of the commodity tokens per unit amount of the currency and in order of earlier to later order time; and merging the huge number of orders on the second order book side to match one order on a first order book side and to execute the huge number of orders via the matching on the composite order book.

2. The settlement processing system according to claim 1, wherein the commodity is goods having digitally expressible economic value including precious metals, energy resources, storable crops, artworks, and drinking water.

3. A settlement processing method, comprising:

in a computer:

controlling a screen to display quote prices of a commodity as that traded at major commodity exchanges per minimum unit quantity of the commodity;

accepting trading orders for the commodity at certain prices per minimum unit quantity of the commodity;

controlling a first order-information storage to store first order information on the accepted trading orders for the commodity;

controlling the screen to display quote amounts of commodity tokens per unit amount of a currency, wherein the quote amounts are less than a minimum unit quantity of the commodity;

accepting trading orders for the commodity tokens at certain amounts of the commodity tokens per unit amount of the currency;

controlling a second order-information storage to store second order information on the accepted trading orders for the commodity tokens;

reading out the stored first order information on the accepted trading orders for the commodity;

counting, based on the read out of the first order information, a first ordered quantity at each price value of a plurality of price values;

creating a first order book on which the counted first ordered quantity at the each price value is listed in order of the price value;

reading out the stored second order information on the accepted trading orders for the commodity tokens;

counting, based on the read out of the second order information, a second ordered quantity at each amount of the commodity tokens;

creating a second order book on which the counted second ordered quantity for the each amount is listed in order of the amount of the commodity tokens;

converting a data format of the second order book into a same format as that of the first order book to create a converted second order book;

merging the first order book and the converted second order book to create a composite order book, wherein the first order book is merged with the converted second order book such that the first order information and the second order information are sorted by the price value;

calculating a total value of the first ordered quantity and the second ordered quantity up to or down to the each price value for each of sell orders and buy orders on the composite order book;

dividing the calculated total value into a first total value that is a largest integer multiple of a minimum trading unit on the first order book and a second total value as a remaining value after subtraction of the first total value from the calculated total value;

comparing the sell orders with the buy orders on the composite order book;

specifying, based on the comparison, a first price range in which prices for the sell orders and prices for the buy orders match;

identifying, in the specified first price range, an equal ordered quantity that is smaller one of the first total value of sell orders and the first total value of buy orders, of the sell orders and the buy orders as matched orders;

reconverting, out of the matched orders on the composite order book, sell orders or buy orders from the converted second order book to have a same data format as that of the second order book;

executing, out of the stored first order information, the sell orders or the buy orders that are derived from the first order book and identified as the matched orders on the composite order book, in order of order price and in order of earlier to later order time;

updating the first order-information storage so that order information corresponding to the executed sell orders or the buy orders indicates an "already executed" status;

executing, out of the stored second order information, the reconverted sell orders or the reconverted buy orders in order of the amount of the commodity tokens per unit amount of the currency and in order of earlier to later order time;

updating the second order-information storage so that order information corresponding to the executed sell orders or the buy orders, associated with the second order book, indicates the "already executed" status;

updating the composite order book by
  subtracting the equal ordered quantity, of the executed sell orders or the buy orders from the first ordered quantity or the second ordered quantity and the calculated total value;

comparing the sell orders against the buy orders on the updated composite order book, to specify a second price range in which prices for the sell orders and prices for the buy orders in the updated composite order book match;

identifying, in the specified second price range, an equal ordered quantity, that is matched to one of the second total value of sell orders or the second total value of buy orders, of the sell orders and the buy orders as the matched orders;

reconverting, out of the matched orders in the specified second price range on the composite order book, sell orders or buy orders from the converted second order book to have the same data format as that of the second order book;

executing, out of the stored second order information, the reconverted sell orders or the buy orders in the specified second price range in order of the amount of the commodity tokens per unit amount of the currency and in order of earlier to later order time;

updating the second order-information storage so that order information corresponding to the executed sell orders or the buy orders, in the specified second price range, indicates the "already executed" status; and functioning as a computer system load expansion prevention means for preventing a load on the computer from growing enormously because of involvement of an arbitrage function by High Frequency Transactions (HFT) caused by repeated placing of a huge number of orders with minute unit quantities on a second order book side, when arbitrage trading is involved between the first order book and the second order book, by:

converting the data format of the second order book into the same format as that of the first order book to create the converted second order book;

merging the first order book and the converted second order book to create the composite order book;

calculating the total value of the first ordered quantity and the second ordered quantity up to or down to the each price value for each of the sell orders and the buy orders on the composite order book;

dividing the calculated total value into the first total value that is the largest integer multiple of the minimum trading unit on the first order book and the second total value as the remaining value after the subtraction of the first total value from the calculated total value;

comparing the sell orders with the buy orders on the composite order book;

specifying, based on the comparison, the first price range in which the prices for the sell orders and the prices for the buy orders match;

identifying, in the specified first price range, the equal ordered quantity that is smaller one of the first total value of sell orders and the first total value of buy orders, of the sell orders and the buy orders as the matched orders;

reconverting, out of the matched orders on the composite order book, the sell orders or the buy orders from the converted second order book to have the same data format as that of the second order book;

executing, out of the stored second order information, the reconverted sell orders or the buy orders in the specified second price range in order of the amount of the commodity tokens per unit amount of the currency and in order of earlier to later order time; and merging the huge number of orders on the second order book side to match one order on a first order book side and to execute the huge number of orders via the matching on the composite order book.

4. A non-transitory computer-readable medium having stored thereon, computer-executable instructions which, when executed by a computer, cause the computer to execute operations, the operations comprising:

controlling a screen to display quote prices of a commodity as that traded at major commodity exchanges per minimum unit quantity of the commodity;

accepting trading orders for the commodity at certain prices per minimum unit quantity of the commodity;

controlling a first order-information storage to store first order information on the accepted trading orders for the commodity;

controlling the screen to display quote amounts of commodity tokens per unit amount of a currency, wherein the quote amounts are less than a minimum unit quantity of the commodity;

accepting trading orders for the commodity tokens at certain amounts of the commodity tokens per unit amount of the currency;

controlling a second order-information storage to store second order information on the accepted trading orders for the commodity tokens;

reading out the stored first order information on the accepted trading orders for the commodity;

counting, based on the read out of the first order information, a first ordered quantity at each price value of a plurality of price values;

creating a first order book on which the counted first ordered quantity at the each price value is listed in order of the price value;

reading out the stored second order information on the accepted trading orders for the commodity tokens;

counting, based on the read out of the second order information, a second ordered quantity at each amount of the commodity tokens;

creating a second order book on which the counted second ordered quantity for the each amount is listed in order of the amount of the commodity tokens;

converting a data format of the second order book into a same format as that of the first order book to create a converted second order book;

merging the first order book and the converted second order book to create a composite order book, wherein the first order book is merged with the converted second order book such that the first order information and the second order information are sorted by the price value;

calculating a total value of the first ordered quantity and the second ordered quantity up to or down to the each price value for each of sell orders and buy orders on the composite order book;

dividing the calculated total value into a first total value that is a largest integer multiple of a minimum trading unit on the first order book and a second total value as a remaining value after subtraction of the first total value from the calculated total value;

comparing the sell orders with the buy orders on the composite order book;

specifying, based on the comparison, a first price range in which prices for the sell orders and prices for the buy orders match;

identifying, in the specified first price range, an equal ordered quantity that is smaller one of the first total value of sell orders and the first total value of buy orders, of the sell orders and the buy orders as matched orders;

reconverting, out of the matched orders on the composite order book, sell orders or buy orders from the converted second order book to have a same data format as that of the second order book;

executing, out of the stored first order information, the sell orders or the buy orders that are derived from the first order book and identified as the matched orders on the composite order book, in order of order price and in order of earlier to later order time;

updating the first order-information storage so that order information corresponding to the executed sell orders or the buy orders indicates an "already executed" status;

executing, out of the stored second order information, the reconverted sell orders or the reconverted buy orders in order of the amount of the commodity tokens per unit amount of the currency and in order of earlier to later order time;

updating the second order-information storage so that order information corresponding to the executed sell orders or the buy orders, associated with the second order book, indicates the "already executed" status;

updating the composite order book by
subtracting the equal ordered quantity, of the executed sell orders or the buy orders from the first ordered quantity or the second ordered quantity and the calculated total value;

comparing the sell orders against the buy orders on the updated composite order book, to specify a second price range in which prices for the sell orders and prices for the buy orders in the updated composite order book match;

identifying, in the specified second price range, an equal ordered quantity, that is matched to one of the second total value of sell orders or the second total value of buy orders, of the sell orders and the buy orders as the matched orders;

reconverting, out of the matched orders in the specified second price range on the composite order book, sell orders or buy orders from the converted second order book to have the same data format as that of the second order book;

executing, out of the stored second order information, the reconverted sell orders or the buy orders in the specified second price range in order of the amount of the commodity tokens per unit amount of the currency and in order of earlier to later order time; and updating the second order-information storage so that order information corresponding to the executed sell orders or the buy orders, in the specified second price range, indicates the "already executed" status, the non-transitory computer-readable medium comprising:

a function as a computer system load expansion prevention means for preventing a load on the computer from growing enormously because of involvement of an arbitrage function by High Frequency Transactions (HFT) caused by repeated placing of a huge number of orders with minute unit quantities on a second order book side, when arbitrage trading is involved between the first order book and the second order book, by:

converting the data format of the second order book into the same format as that of the first order book to create the converted second order book;

merging the first order book and the converted second order book to create the composite order book;

calculating the total value of the first ordered quantity and the second ordered quantity up to or down to the each price value for each of the sell orders and the buy orders on the composite order book;

dividing the calculated total value into the first total value that is the largest integer multiple of the minimum trading unit on the first order book and the second total value as the remaining value after the subtraction of the first total value from the calculated total value;

comparing the sell orders with the buy orders on the composite order book;

specifying, based on the comparison, the first price range in which the prices for the sell orders and the prices for the buy orders match;

identifying, in the specified first price range, the equal ordered quantity that is smaller one of the first total value of sell orders and the first total value of buy orders, of the sell orders and the buy orders as the matched orders;

reconverting, out of the matched orders on the composite order book, the sell orders or the buy orders from the converted second order book to have the same data format as that of the second order book;

executing, out of the stored second order information, the reconverted sell orders or the buy orders in the specified second price range in order of the amount of the commodity tokens per unit amount of the currency and in order of earlier to later order time; and merging the huge number of orders on the second order book side to match one order on a first order book side and to execute the huge number of orders via the matching on the composite order book.

* * * * *